(12) United States Patent
Saito et al.

(10) Patent No.: US 8,917,401 B2
(45) Date of Patent: Dec. 23, 2014

(54) CONTROLLING DEVICE FOR MULTI-FUNCTION DEVICE

(71) Applicants: Ken Saito, Tokoname (JP); Masafumi Miyazawa, Nagoya (JP)

(72) Inventors: Ken Saito, Tokoname (JP); Masafumi Miyazawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 4 days.

(21) Appl. No.: 13/705,721

(22) Filed: Dec. 5, 2012

(65) Prior Publication Data

US 2013/0141744 A1 Jun. 6, 2013

(30) Foreign Application Priority Data

Dec. 5, 2011 (JP) ................................. 2011-265654

(51) Int. Cl.
*H04N 1/44* (2006.01)
*H04N 1/00* (2006.01)

(52) U.S. Cl.
CPC ......... *H04N 1/00095* (2013.01); *H04N 1/4426* (2013.01)
USPC ....................................... 358/1.13; 358/1.16

(58) Field of Classification Search
USPC ................................................ 358/468, 1.15
See application file for complete search history.

(56) References Cited

U.S. PATENT DOCUMENTS

| 8,576,422 | B2 * | 11/2013 | Kimura | 358/1.14 |
| 2010/0171973 | A1 * | 7/2010 | Kimura | 358/1.14 |
| 2011/0085195 | A1 * | 4/2011 | Tsuchiya | 358/1.14 |
| 2011/0122439 | A1 * | 5/2011 | Sato et al. | 358/1.15 |
| 2011/0126270 | A1 * | 5/2011 | Sato et al. | 726/4 |
| 2011/0228311 | A1 * | 9/2011 | Oguma et al. | 358/1.14 |
| 2012/0011585 | A1 * | 1/2012 | Otake et al. | 726/17 |
| 2013/0057895 | A1 * | 3/2013 | Okazawa | 358/1.14 |
| 2013/0070288 | A1 * | 3/2013 | Muranaka | 358/1.15 |
| 2013/0088751 | A1 * | 4/2013 | Yoshida | 358/1.15 |
| 2013/0155449 | A1 * | 6/2013 | Fernandes et al. | 358/1.15 |

FOREIGN PATENT DOCUMENTS

JP 2005-258945 A 9/2005
JP 2005-269250 A 9/2005

* cited by examiner

*Primary Examiner* — Jerome Grant, II
(74) *Attorney, Agent, or Firm* — Banner & Witcoff, Ltd.

(57) ABSTRACT

A controlling device for a multi-function device may acquire specific function information for a specific service providing server from a first storage unit, and acquire specific use information for a specific user from a second storage unit. The controlling device may determine, by using the specific function information and the specific use information, whether or not a usable function exists. The controlling device may execute a process for the multi-function device to receive a service related to the usable function from the specific service providing server in a case where it is determined that the usable function exists, and execute a process for prohibiting the multi-function device to receive a service from the specific service providing server in a second case where h is determined that the usable function does not exist.

10 Claims, 11 Drawing Sheets

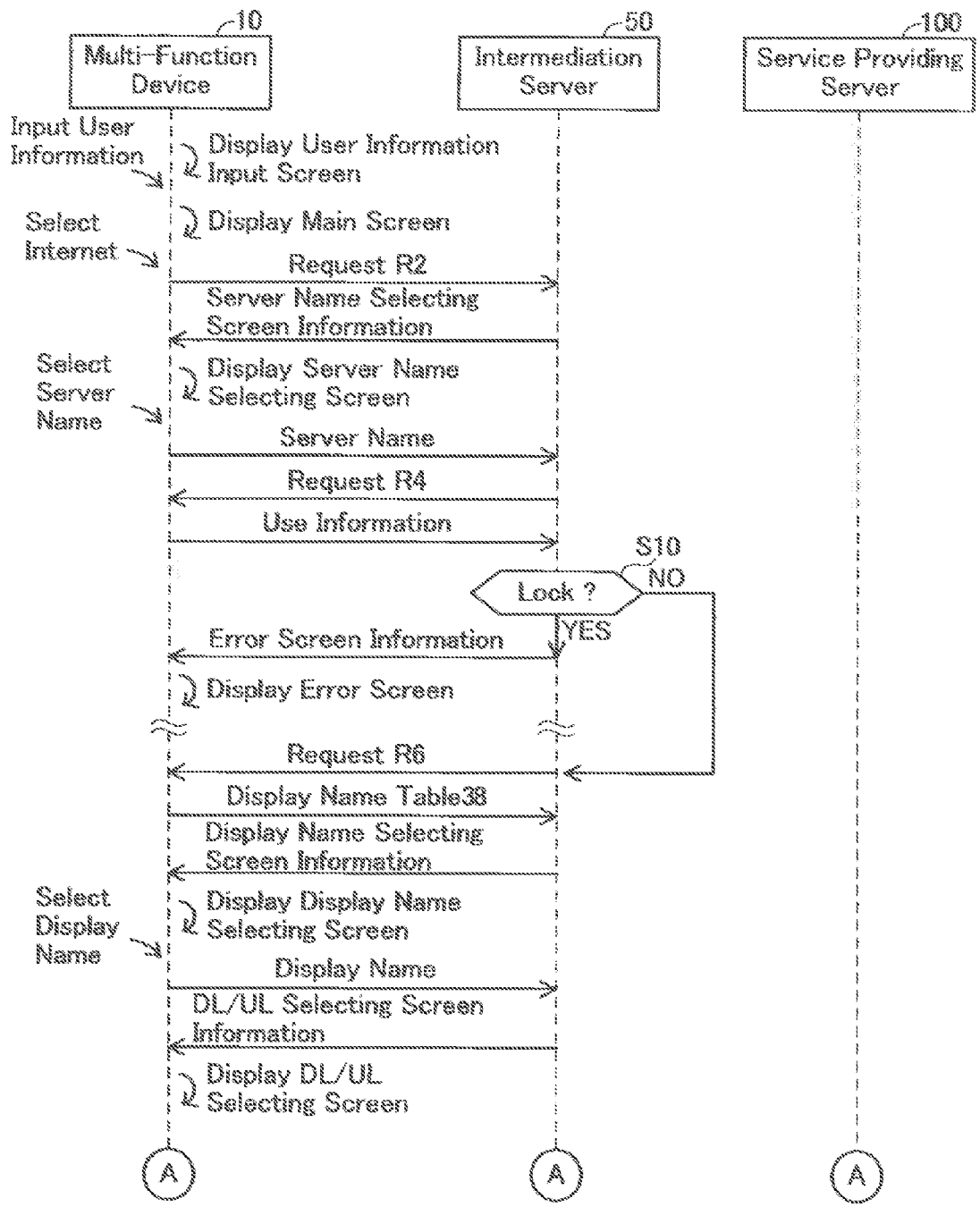

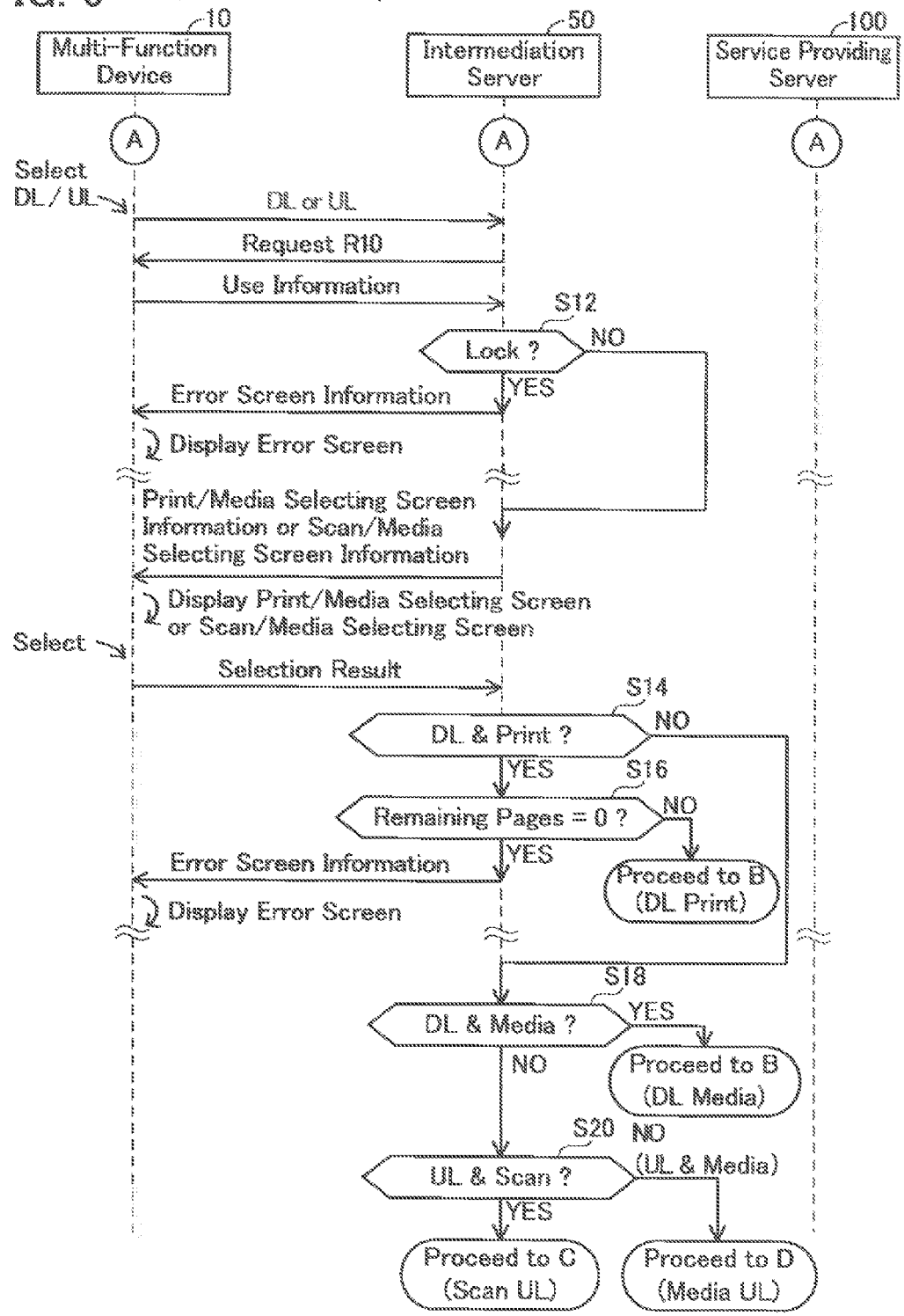

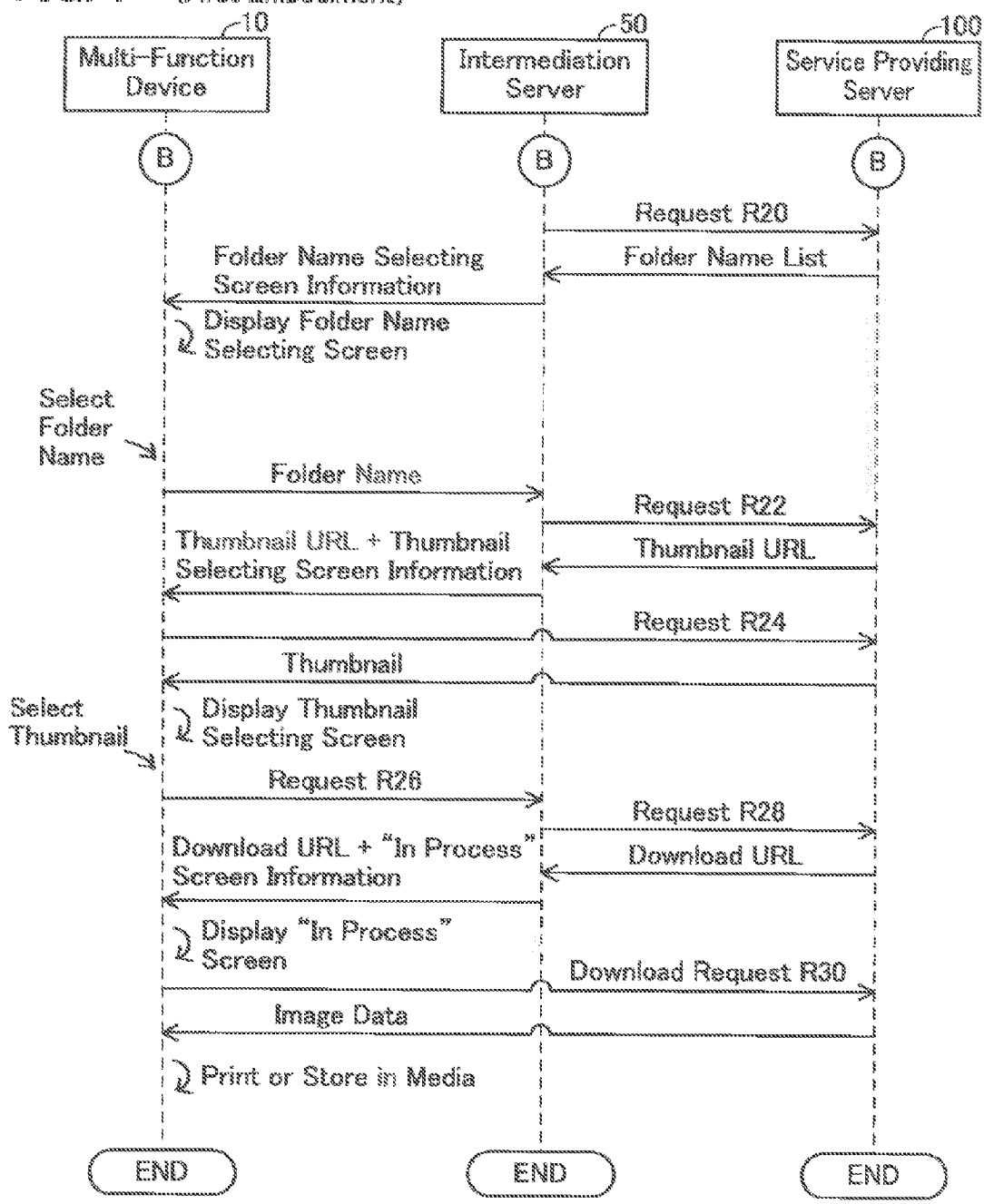

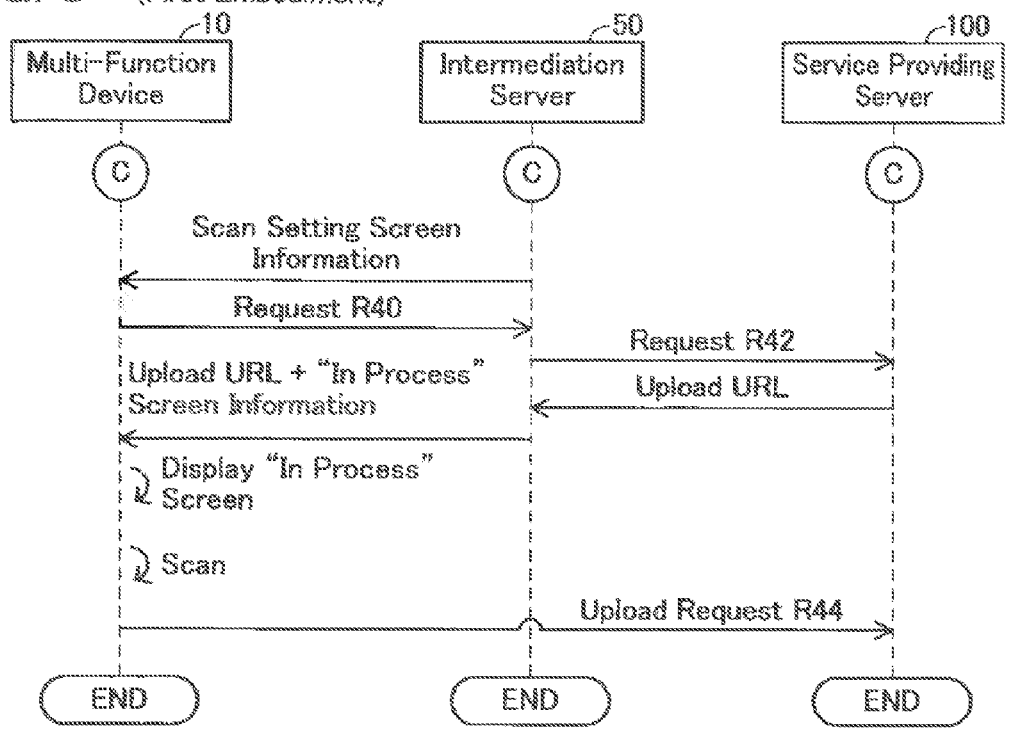
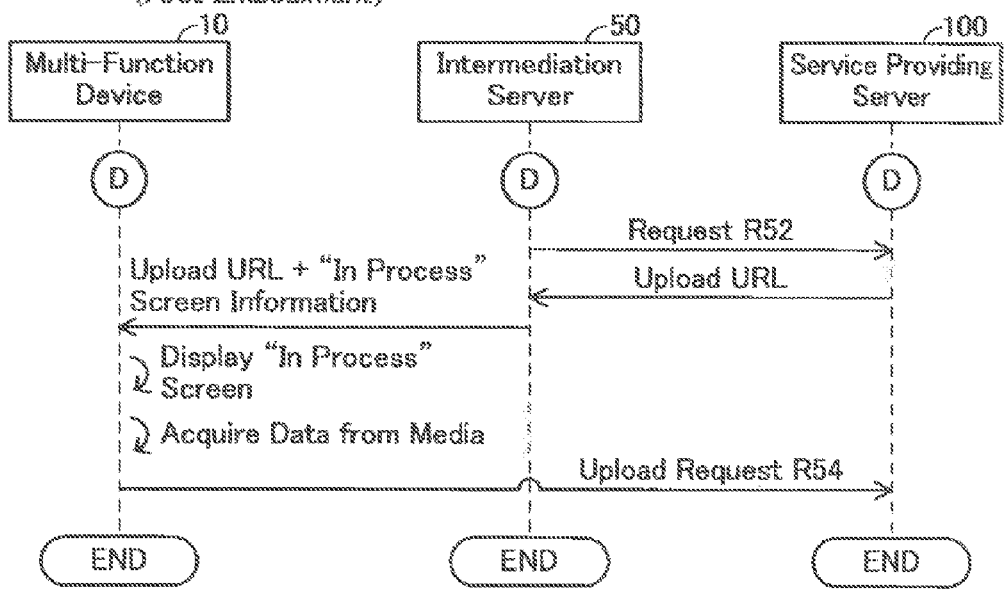

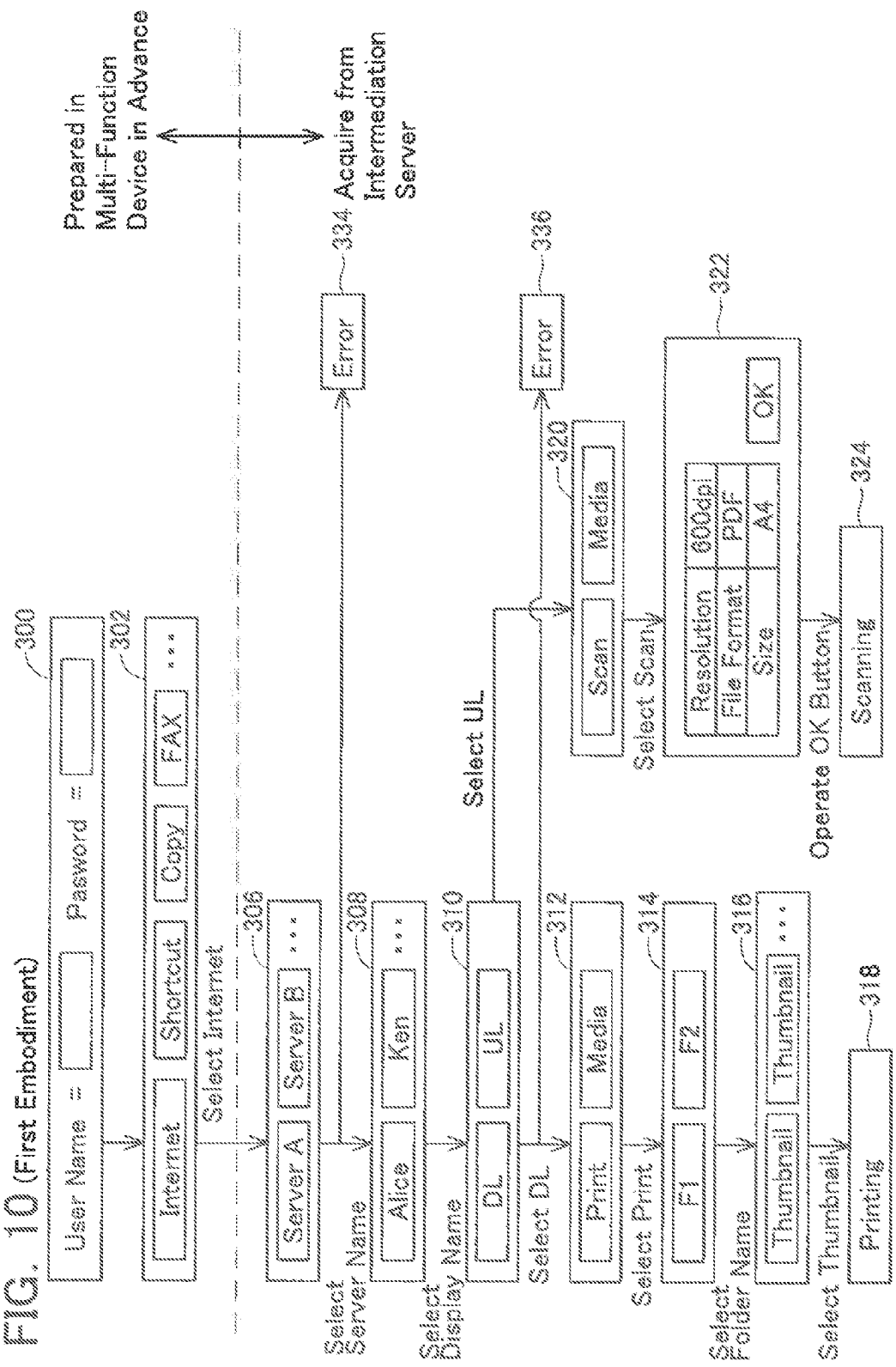

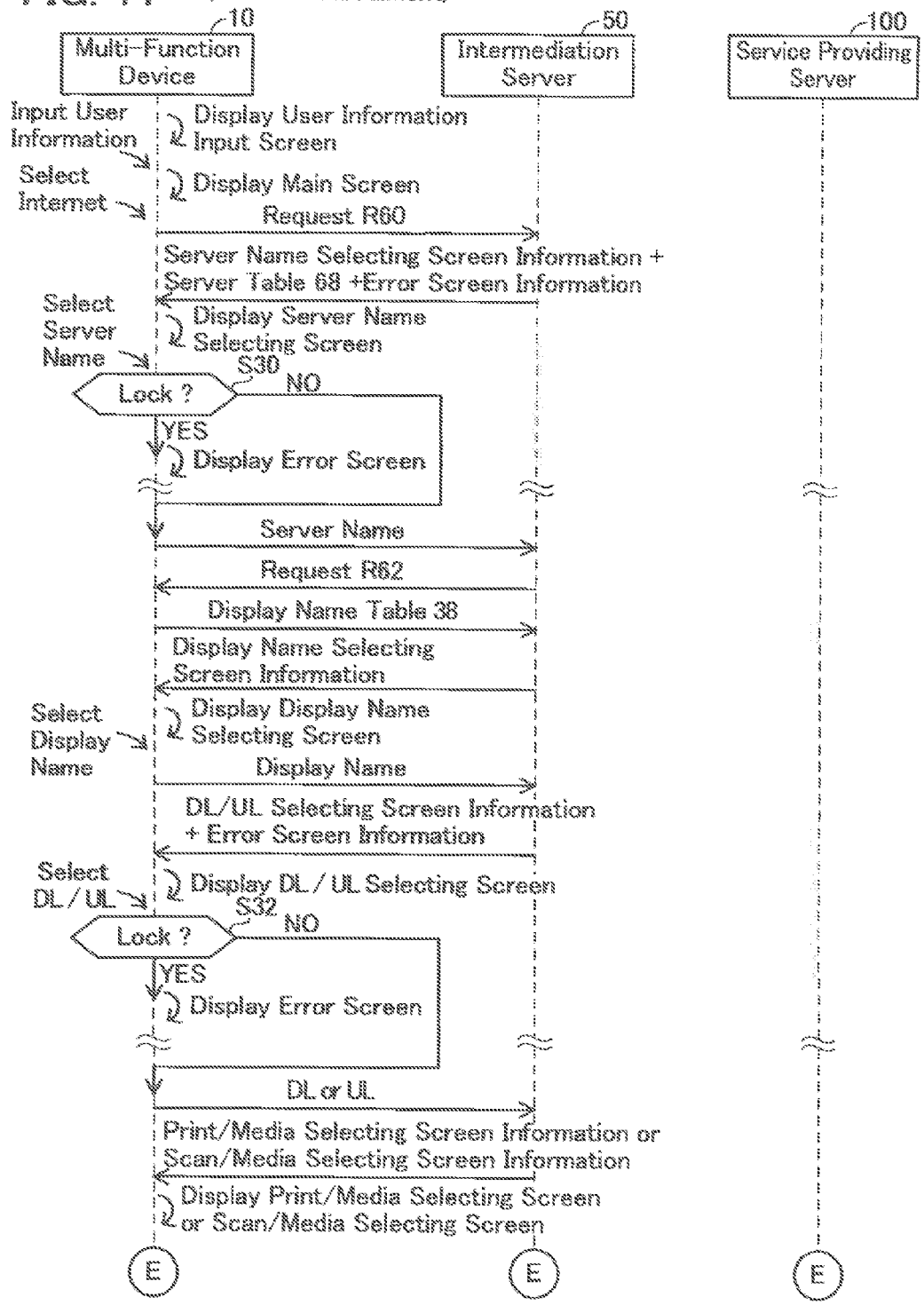

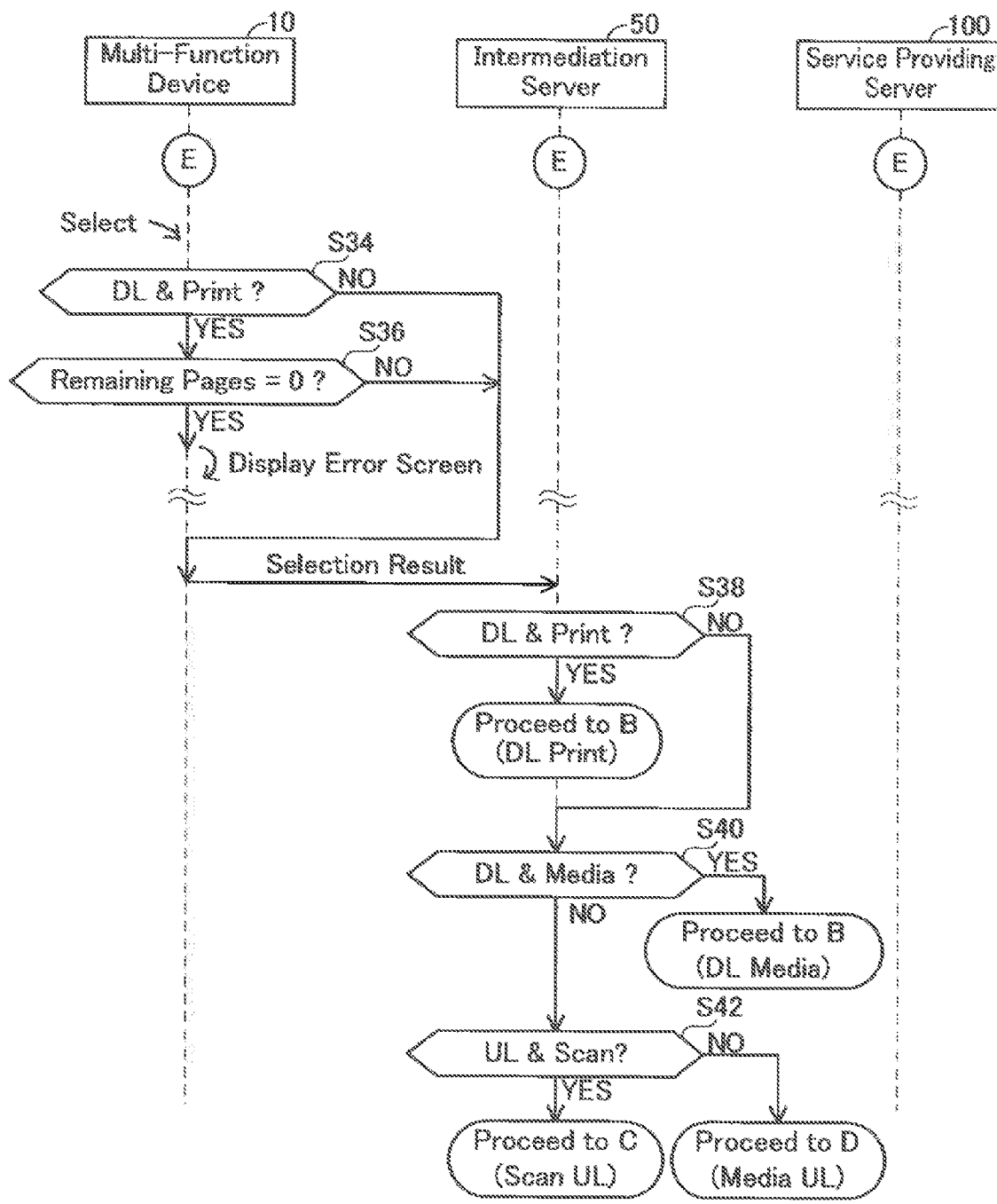
FIG. 12 (Second Embodiment)

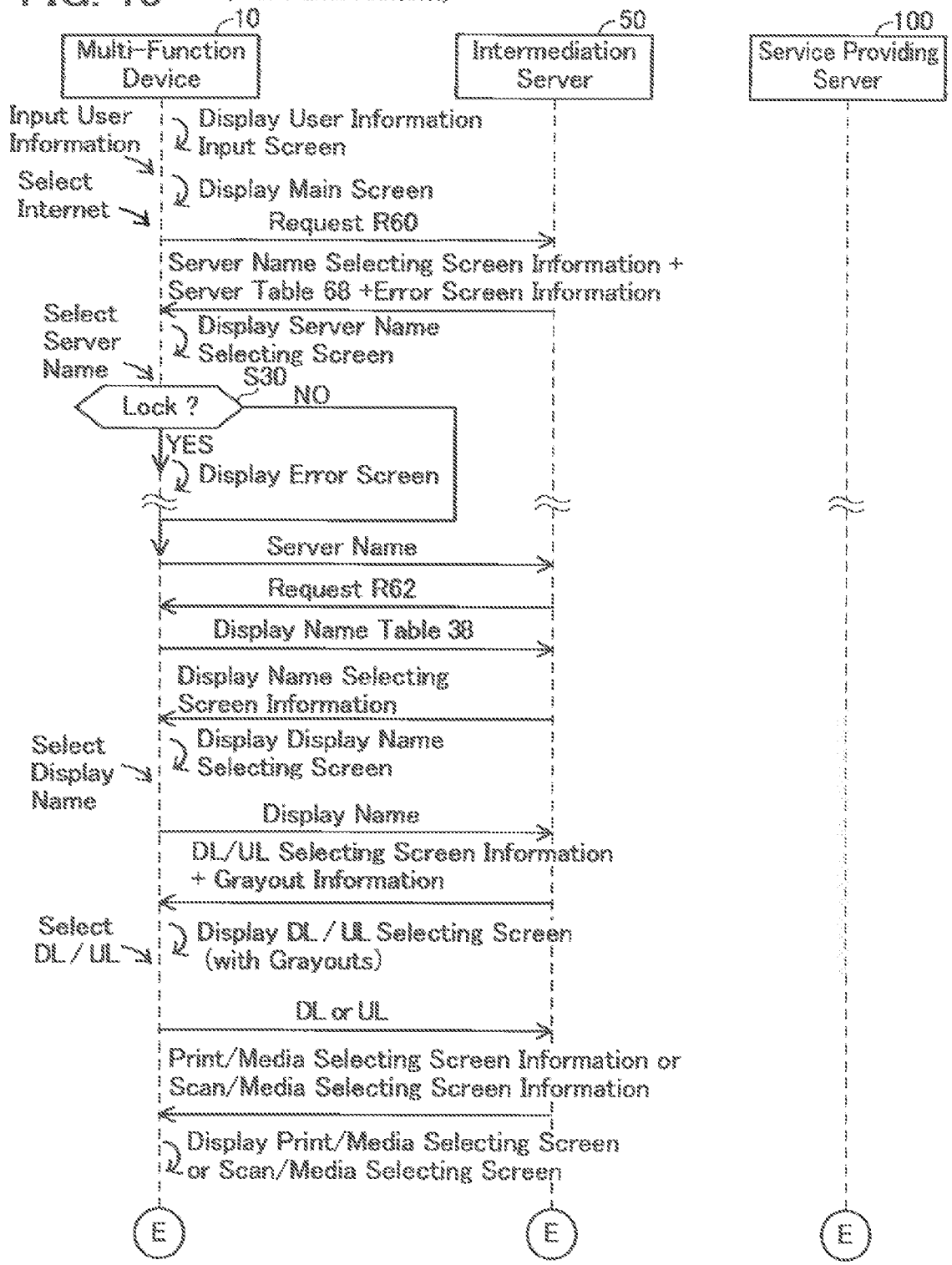
FIG. 13 (Third Embodiment)

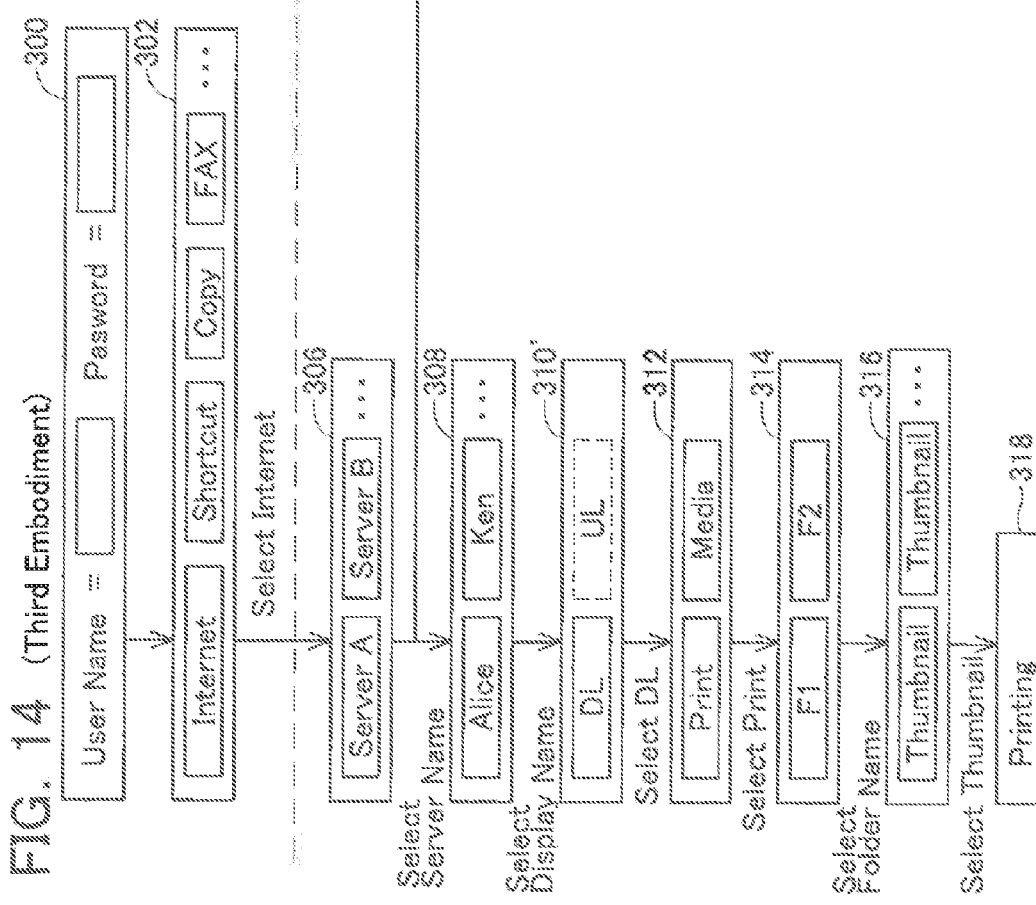

CONTROLLING DEVICE FOR MULTI-FUNCTION DEVICE

CROSS-REFERENCE TO RELATED APPLICATIONS

This application claims priority to Japanese Patent Application No. 2011-265854, filed on Dec. 5, 2011, the contents of which are hereby incorporated by reference into the present application.

TECHNICAL FIELD

In the present specification, a controlling device for a multi-function device in disclosed, this controlling device being capable of executing a first function and a second function.

DESCRIPTION OF RELATED ART

For example, an image processing device for scanning a document and creating image data is known. The image processing device can upload the image data to a server.

SUMMARY

The present specification presents a technique which, when a user of a multi-function device wishes to receive a service from a specific service providing server among a plurality of service providing servers, allows a controlling device for the multi-function device to execute an appropriate process.

One aspect disclosed in the present specification may be a controlling device for a multi-function device configured to execute a first function and a second function. The controlling device may comprise: a processor, and a memory configured to store computer-readable instructions therein, the computer-readable instructions, when executed by the processor, causing the controlling device to operate as: a first acquiring unit configured to acquire specific function information for a specific service providing server from a first storage unit in a case where the specific service providing server is selected from among a plurality of service providing servers by a specific user who uses the multi-function device, the first storage unit configured to store a plurality of function information for the plurality of service providing servers, and each function information including information related to whether or not each service providing server can correspond to the first function and whether or not each service providing server can correspond to the second function; a second acquiring unit configured to acquire specific use information for the specific user from a second storage unit the second storage unit configured to store a plurality of use information for a plurality of users, and each use information including information related to whether or not each user is allowed to use the first function and whether or not each user is allowed to use the second function; a first determining unit configured to determine, by using the specific function information and the specific use information, whether or not a usable function exists, the usable function being a function to which the specific service providing server can correspond and which the specific user is allowed to use; a service receiving process executing unit configured to execute a first service receiving process for the multi-function device to receive a service related to the usable function from the specific service providing server in a first case where it is determined that the usable function exists; and an error process executing unit configured to execute a first error process for prohibiting the multi-function device to receive a service from the specific service providing server in a second case where it is determined that the usable function does not exist.

Moreover, a control method, computer-readable instructions, and a non-transitory computer-readable storage medium, all for realizing the controlling device, are also novel and useful.

BRIEF DESCRIPTION OF THE DRAWINGS

FIG. 5 shows a sequence diagram of processes executed by devices in a first embodiment.

FIG. 6 shows a sequence diagram of a continuation of FIG. 5.

FIG. 7 shows a sequence diagram of processes for data download.

FIG. 8 shows a sequence diagram of processes for scan upload.

FIG. 9 shows a sequence diagram of processes for media upload.

FIG. 10 shows transition of screens displayed on the multi-function device in the first embodiment.

FIG. 11 shows a sequence diagram of processes executed by devices in a second embodiment.

FIG. 12 shows a sequence diagram of a continuation of FIG. 11.

FIG. 13 shows a sequence diagram of processes executed by devices in a third embodiment.

FIG. 14 shows transition of screens displayed on the multi-function device in the third embodiment.

EMBODIMENT

First Embodiment (Configuration of System)

Figure 1:
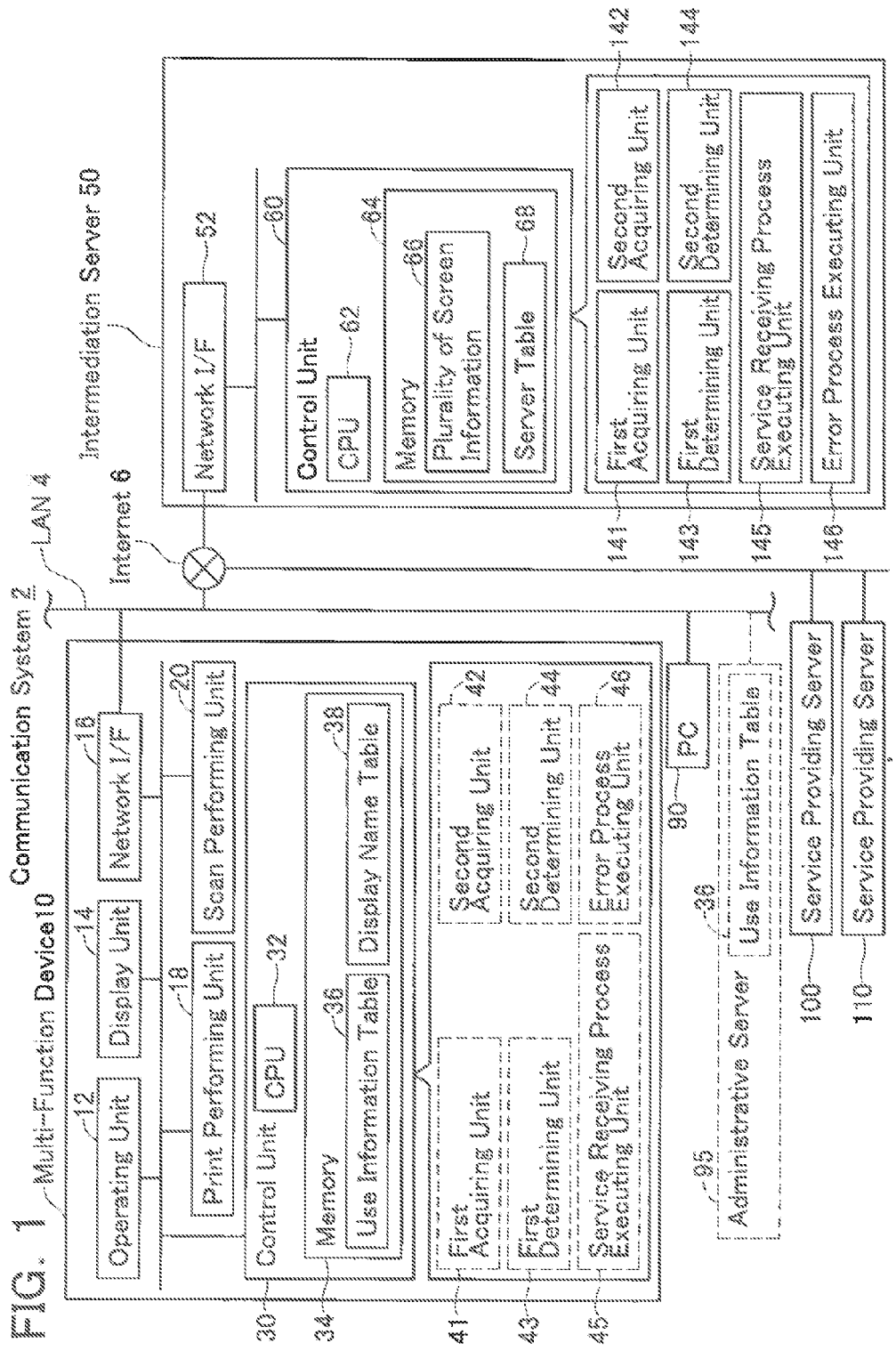
FIG. 1 shows the configuration of a communication system.

As shown in FIG. 1, a communication system 2 comprises a multi-function device 10, an intermediation server 50, a PC 90, and a plurality of service providing servers 100, 110. The multi-function device 10 and the PC 90 are connected with a LAN 4. The intermediation server 50 and the plurality of service providing servers 100, 110 are connected with an Internet 6.

(Configuration of Multi-Function Device 10)

The multi-function device 10 is capable of executing multiple functions such as a print function, scan function, copy function, FAX function, etc. The multi-function device 10, further, is capable of executing a DL function for downloading data from the service providing servers 100, 110 on the Internet, and is capable of executing an UL function for uploading data to the service providing servers 100, 110 on the Internet. Moreover, the DL function includes a DL print function for executing printing according to the downloaded data, and a DL media function for storing the downloaded data in an external memory (e.g., a USB memory) connected with the multi-function device 10. Further, the UL function includes a scan UL function for uploading data created by a scan, and a media UL function for uploading data within the external memory connected with the multi-function device 10.

The multi-function device 10 comprises an operating unit 12, a display unit 14, a network interface 16, a print executing unit 18, a scan executing unit 20 and a control unit 30. The operating unit 12 comprises a plurality of keys. A user can input various instructions to the multi-function device 10 by operating the operating unit 12. The display unit 14 is a display for displaying various types of information. The network interface 16 is connected with the LAN 4. The print executing unit 18 comprises an inkjet type or laser type, etc. printing mechanism. The scan executing unit 20 comprises a scanning mechanism such as CCD or CIS, etc.

The control unit 30 comprises a CPU 32 and a memory 34. The CPU 32 executes various processes according to programs stored in the memory 34. The functions of units 41 to 46 are realized by the CPU 32 executing processes according to the programs. Moreover, the units 41 to 46 of the multi-function device 10 are not operated in the first embodiment, but are operated in a second embodiment (to be described). The memory 34 stores a use information table 36 and a display name table 38 in addition to the above programs.

Figure 2:
FIG. 2 shows an example of a use information table.

When an administrator of the LAN 4 operates the operating unit 12 to input predetermined information, the use information table 36 is created (i.e., stored) within the memory 34. As shown in FIG. 2, the use information table 36 includes a plurality of use information for a plurality of users. The use information is information in which the following are associated: user name, password, information indicating whether the user is allowed to use the copy function, information indicating whether the user is allowed to use the FAX function, information indicating whether the user is allowed to use the DL function, information indicating whether the user is allowed to use the UL function, and number of print media available to the user before printing (remaining pages). Moreover, "Unlock" indicates that the user is allowed to use a function (i.e., indicates that the use of the function is permitted to the user), and "Lock" indicates that the user is not allowed to use the function (i.e., indicates that the use of a function is not permitted to the user).

Figure 3:
FIG. 3 shows an example of a display name table.

As shown in FIG. 3, the display name table 38 is a table for storing information in which display name, server name and access token are associated. The manner in which the display name table 38 is created will be described later.

(Configuration of Intermediation Server 50)

The intermediation server 50 is a server for intermediating the provision of service from the service providing servers 100, 110 to the multi-function device 10. The intermediation server 50 is a server provided by the vendor or manufacturer of the multi-function device 10. The intermediation server 50 comprises a network interface 52 and a control unit 60. The control unit 60 comprises a CPU 62 and a memory 64. The CPU 62 executes various processes according to programs stored in the memory 64. The functions of units 141 to 146 are realized by the CPU 62 executing processes according to the programs.

Moreover, in addition to the aforementioned programs, the memory 64 stores a plurality of screen information 66 and a server table 68. The plurality of screen information 66 and the server table 68 are stored in advance in the intermediation server 50 by the vendor or manufacturer of the multi-function device 10. The plurality of screen information 66 includes screen information representing screens (screens 306 to 318, 320 to 324, 334 to 336 of FIG. 10; to be described) relating to the DL function and UL function that the multi-function device 10 is capable of executing.

Figure 4:
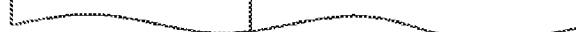
FIG. 4 shows an example of a server table.

As shown in FIG. 4, the server table 68 is a table for storing information in which a server name and available services (that is "corresponding functions") are associated. In the present embodiment, "Server A", "Server B" are the respective server names of the service providing servers 100, 110. The "DL" of the available services indicates that the service providing server cm provide a DL service for supplying data to a communication device (e.g., the multi-function device 10), i.e., indicates that the service providing server corresponds to the DL function of the multi-function device 10. The "UL" of the available services indicates that the service providing server can provide a UL service for acquiring data from the communication device and storing the data, i.e., indicates that the service providing server corresponds to the UL function of the multi-function device 10.

More specifically, in the example of FIG. 4, the available services of the server name "Server A" are "DL" and "UL". This means (1) that the service providing server 100 that has the server name "Server A" is capable of providing the DL service and the UL service, and (2) the intermediation server 50 corresponds to the DL service and UL service of the service providing server 100 (i.e., the intermediation server 50 corresponds to APIs (Application Program Interface; described in detail later) for the DL service and UL service of the service providing server 100). Further, the available services of the server name "Server B" is "DL only". This means (1) that the service providing server 110 that has the server name "Server B" is capable of providing the DL service, and (2) the intermediation server 50 corresponds to the DL service of the service providing server 110 (i.e., the intermediation server 50 corresponds to an API for the DL service of the service providing server 110). Moreover, the available services of the server name "Server B" do not include "UL". This means (1) that the service providing server 110 is not providing the UL service or, (2) that the service providing server 110 is providing the UL service, but the intermediation server 50 is not corresponding to the UL service of the service providing server 110 (i.e., the intermediation server 50 is not corresponding to the API for the UL service of the service providing server 110). Further, the available services of a server name "Server C" do not include "DL". This means (1) that the service providing server having the server name "Server C" is not providing the DL service or, (2) that the service providing server is providing the DL service, but the intermediation server 50 is not corresponding to the DL service of the service providing server.

(Configuration of Service Providing Servers 100, 110)

Each of the service providing servers 100, 110 is a known service providing server for, e.g., "Evernote (Registered Trademark)", "Google (Registered Trademark) Docs", "PICASA (Registered Trademark)", "FACEBOOK (Registered Trademark)", etc. Each of the service providing servers 100, 110 is capable of providing service to various communication devices including the multi-function device 10. As was described with reference to FIG. 4, e.g., the service providing server 100 is capable of providing both the DL service and the UL service to the multi-function device 10, and the service providing server 110 is capable of providing only the DL service to the multi-function device 10.

Moreover, the service providing server 100 is a server provided by a first service provider (i.e., a first company), and the service providing server 110 is a server provided by a second service provider (i.e., a second company) that is different from the first service provider. The first service provider exposes a first API for receiving a service from the service providing server 100, and the second service provider exposes a second API for receiving a service from the service providing server 110. Since the first service provider and the second service provider are different, the first API and the second API are usually different. In order to receive services from, for example, both the service providing servers 100, 110, communication devices must correspond to both the first and the second API (i.e., require both a program for utilizing the first API and a program for utilizing the second API).

For example, in order for the multi-function device 10 to receive services from each of the plurality of service providing servers 100, 110, the multi-function device 10 must correspond to the plurality of APIs, and must store many programs. However, the storage capacity of the memory 34 of me multi-function device 10 is smaller than that of a PC, etc. Consequently, in the present embodiment the intermediation server 50 is provided so that, without causing many programs to be stored in the multi-function device 10, the multi-function device 10 can receive services from each of the plurality of service providing servers 100, 110. That is, the intermediation server 50 corresponds to the plurality of APIs for the plurality of service providing servers 100, 110. In a situation where the multi-function device 10 is to receive a service from a specific service providing server (e.g., the service providing server 100) from among the plurality of service providing servers 100, 110, the intermediation server 50 executes various communications (to be described; e.g., communication of requests R20, R22, R28, R42, R52, etc, shown in FIG. 7 to FIG. 9) with the specific service providing server by using the API for the specific service providing server. Thereby, even without corresponding to the API for the specific service providing server, the multi-function device 10 can communicate data with the specific service providing server. That is, the multi-function device 10 can receive services from each of the plurality of service providing servers 100, 110 even without storing many programs for using the plurality of APIs. Further, in a case where the specifications of the service providing server are changed, it is possible to correspond to the specification change by changing the programs of the intermediation server 50 even without changing the programs of the multi-function device 10. Further, if the program of the intermediation server 50 is changed so as to correspond to an API for a novel service providing server that is not registered in the server table 68 of the intermediation server 50, the multi-function device 10 can receive a service from the novel service providing server even without changing the programs of the multi-function device 10.

(Advance Preparation by User of Multi-Function Device 10)

In order for the multi-function device 10 to receive a service from the service providing servers 100, 110, the user of the multi-function device 10 (called "specific user" below) must execute the following advance preparation. The specific user accesses the intermediation server 50 by using the PC 90, and selects "acquire authentication information". Moreover, in the present embodiment, the "authentication information" means an access token (to be described: e.g., "XXXXXXXX"). When "acquire authentication information" is selected, the intermediation server 50 sends, to the PC 90, a specific URL for accessing the service providing server 100. The specific URL includes a creating instruction for instructing the service providing server 100 to create the access token, and a sending instruction for instructing the service providing server 100 to send the access token to the intermediation server 50. By using the specific URL, the specific user accesses the service providing server 100 from the PC 90. Next, via the PC 90, the specific user inputs account name and password into the service providing server 100, executing an authentication procedure. When, authentication has succeeded, the service providing server 100 creates an access token (e.g., "XXXXXXXX") for the specific user, and sends the access token to the intermediation server 50.

Upon receiving the access token for the specific user from the service providing server 100, the intermediation server 50 creates a temporary ID, and sends the temporary ID to the PC 90. Thereby, the temporary ID is displayed in the PC 90. The specific user can learn the temporary ID displayed in the PC 90.

Next, by operating the operating unit 12 of the multi-function device 10, the specific user inputs, into the multi-function device 10, the server name (e.g., "Server A") of the service providing server 100, and the display name (e.g., "Alice"), which is a name for displaying the specific user on the multi-function device 10. By operating the operating unit 12 of the multi-function device 10, the specific user further inputs the temporary ID into the multi-function device 10. In this case, the multi-function device 10 sends the temporary ID to the intermediation server 50. Thereby, the intermediation server 50 sends the access token (e.g., "XXXXXXXX") to the multi-function device 10.

By executing the aforementioned processes, the multi-function device 10 can store information in the display name table 38. In the above example, the multi-function device 10 stores, in the display name table 38, information in which the following are associated: the display name (e.g., "Alice") input by the specific user, the server name (e.g., "Server A") input by the specific user, and the access token (e.g., "XXXXXXXX") received from the intermediation server 50. Thus, the intermediation server 50 temporarily stores the access token without the service providing server 100 and the intermediation server 50 sending the access token to the PC 90. Then the multi-function device 10 acquires the access token from the intermediation server 50 by using the temporary ID. Thereby, it is possible to prevent the access token from being displayed in the PC 90 or being sent from the PC 90 to another device, and consequently exit of high security information, i.e., the access token, can be prevented. Moreover, the specific user can also register the server name "Server B" of the service providing server 110, the display name "Alice" and an access token "ZZZZZZZZ" relating to the service providing server 110 in the display name table 38, in the same manner as above.

(Processes Executed by Devices 10, 50, 100; FIG. 5)

As shown in FIG. 5, the control unit 30 of the multi-function device 10 displays a user information input screen 300 (see FIG. 10) on the display unit 14 by using user information input screen information stored in advance in the multi-function device 10. The user information input screen 300 includes a field for inputting the user name and a field for inputting the password. The specific user operates the operating unit 12 to enter the user name and the password.

Next, the control unit 30 displays a main screen 302 (see FIG. 10) on the display unit 14 by using main screen information stored in advance in the multi-function device 10. The main screen 302 includes a plurality of character strings (e.g., "Internet", "Shortcut", "Copy", etc.) indicating a plurality of functions to be selected by the specific user. In the case of wishing the multi-function device 10 to execute the DL function or UL function, the specific user selects the character string "Internet" included in the main screen 302. In this case, the control unit 30 supplies a request R2 to the intermediation server 50.

Upon acquiring the request R2 from the multi-function device 10, the control unit 60 of the intermediation server 50 supplies, to the multi-function device 10, server name selecting screen information included in the plurality of screen information 66.

Upon acquiring the server name selecting screen information from the intermediation server 50, the control unit 30 of the multi-function device 10 displays, on the display unit 14, a server name selecting screen 306 (see FIG. 10) represented by the server name selecting screen information. The server name selecting screen 306 includes the respective server names (e.g., "Server A", "Server B") of the plurality of service providing servers 100, 110. The specific user operates the operating unit 12 to select, from within the server name selecting screen 306, the server name (called "selected server name" below) of the service providing server from which the multi-function device 10 is to receive a service. In the present embodiment, the description will proceed using the case, as an example, where the specific user selects the server name "Server A" (i.e., the server name of the service providing server 100) included in the server name selecting screen 306. In this case, the control unit 30 supplies the selected server name "Server A" to the intermediation server 50.

Upon acquiring the selected server name "Server A" from the multi-function device 10, a second acquiring unit 142 (see FIG. 1) of the intermediation server 50 supplies a request R4 to the multi-function device 10. The request R4 is a request for instructing the multi-function device 10 to supply, to the intermediation server 50, the use information (see FIG. 2) for the specific user who is currently utilizing the multi-function device 10.

Upon acquiring the request R4 from the intermediation server 50, the control unit 30 of the multi-function device 10 acquires specific use information from the use information table 36 within the memory 34 by reading use information (called "specific use information" below) associated with the user name and password that were input into the user Information input screen 300. Next, the control unit 30 supplies the specific use information to the intermediation server 50.

The second acquiring unit 142 of the intermediation server 50 acquires the specific use Information from the multi-function device 10. In this case, a first acquiring unit 141 (see FIG. 1) acquires, from the server table 68 within the memory 64, the available services (i.e. "DL" and "UL"; called "specific corresponding functions" below) associated with the selected server name "Server A". Next, a first determining unit 143 (see FIG. 1) executes a determination process of S10. In the determination process of S10, the first determining unit 143 determines, by using the specific use information and the specific corresponding functions, whether a usable function exists. The usable function is a function (i.e. "DL" and "UL") to which the service providing server 100 having the selected server name "Server A" can correspond, and which the specific user is allowed to use.

Specifically, in a case where at least one function that the specific user is allowed to use exists within the specific corresponding functions, the first determining unit 143 determines that a usable function exists (NO in S10), and in a case where a function that the specific user is allowed to use does not exist within the specific corresponding functions, the first determining unit 143 determines that a usable function does not exist (YES in S10). That is, in the present embodiment, since the specific corresponding functions are "DL" and "UL", the first determining unit 143 determines NO in the determination process of S10 if one of the following indicates "Unlock": DL use information ("Unlock" or "Lock"), which relates to the DL function included in the specific use information, or UL use information ("Unlock" or "Lock"), which relates to the UL function included in the specific use information, or both the DL use information and the UL use information. The first determining unit 143 determines YES in the determination process of S10 in a case where both the DL use information and the UL use information indicate "Lock".

Moreover, in the above example, the case was described where the selected server name is "Server A". However, in a case where, e.g., the selected server name is "Server B", the first acquiring unit 141 acquires, from the server table 68 within the memory 64, the corresponding function "DL" (see FIG. 4) associated with "Server B". In this case, the first determining unit 143 determines that a usable function exists (NO in S10) in a case where the DL use information included in the specific use information indicates "Unlock", and determines that a usable function does not exist (YES in S10) in a case where the DL use information indicates "Lock". Further, e.g., in a case where the selected server name is "Server C", the first acquiring unit 141 acquires the corresponding function "UL" associated with "Server C" (see FIG. 4) from the server table 68 within the memory 64. In this case, the first determining unit 143 determines that a usable function exists (NO in S10) in the case where the UL use information included in the specific use information indicates "Unlock", and determines that a usable function does not exist (YES in S10) in the case where the UL use information indicates "Lock".

In the case where YES is determined in the determination process of S10, an error process executing unit 146 (see FIG. 1) supplies error screen information included in the plurality of screen information 66 to the multi-function device 10. This error screen information includes a character string indicating that, the multi-function device 10 cannot receive any service from the service providing server 100.

Upon acquiring the error screen information from the intermediation server 50, the control unit 30 of the multi-function device 10 displays, on the display unit 14, an error screen 334 (see FIG. 10) represented by the error screen information. Thereby, the specific user can learn that no service can be received from the service providing server 100. Moreover, in this case, the control unit 30 does not execute the processes of FIG. 6 to FIG. 9 (to be described) for receiving a service from the service providing server 100. Thereby, the execution of a function in the multi-function device 10 is prevented. That is, the specific user can be prevented from utilizing a function.

On the other hand, in the case where NO is determined in the determination process of S10, a service receiving process executing unit 145 (see FIG. 1) supplies a request R6 to the multi-function device 10. The request R6 is a request for instructing the multi-function device 10 to supply the display name table 38 to the intermediation server 50. Moreover, below, the service receiving process executing unit 145 is called the "SR process executing unit 145".

Upon acquiring the request R6 from the intermediation server 50, the control unit 30 of the multi-function device 10 supplies the display name table 38 within the memory 34 to the intermediation server 50.

Upon acquiring the display name table 38 from the multi-function device 10, the SR process executing unit 145 of the intermediation server 50 specifies, from within the display name table 38, one or more display names (e.g., "Alice", "Ken") associated with the selected server name "Server A". Next, the SR process executing unit 145 writes the specified one or more display names (e.g., "Alice", "Ken") into display name selecting screen information included in the plurality of screen information 66. Next, the SR process executing unit 145 supplies the display name selecting screen information, into which the one or more display names have been written, to the multi-function device 10.

Upon acquiring the display name selecting screen information from the intermediation server 50, the control unit 30 of the multi-function device 10 displays, on the display unit 14, a display name selecting screen 308 (see FIG. 10) represented by the display name selecting screen information. The display name selecting screen 308 includes one or more display names (e.g., "Alice", "Ken"). The specific user operates the operating unit 12 to select one display name (called "selected display name" below) included in the display name selecting screen 308. In this case, the control unit 30 supplies the selected display name to the intermediation server 50.

Upon acquiring the selected display name from the multi-function device 10, the SR process executing unit 145 of the intermediation server 50 supplies DL/UL selecting screen information included in the plurality of screen information 66 to the multi-function device 10.

Upon acquiring the DL/UL selecting screen information from the intermediation server 50, the control unit 30 of the multi-function device 10 displays, on the display unit 14, a DL/UL selecting screen 310 (see FIG. 10) represented by the DL/UL selecting screen information. The DL/UL selecting screen 310 includes a function name "DL" indicating the DL function and a function name "UL" indicating the UL function. As shown in FIG. 6, the specific user operates the operating unit 12 to select one function name (called "first selected function name" below) included in the DL/UL selecting screen 310. In this case, the control unit 30 supplies the first selected function name to the intermediation server 50.

Upon acquiring the first selected function name ("DL" or "UL") from the multi-function device 10, the second acquiring unit 142 of the intermediation server 50 supplies a request R10 to the multi-function device 10. The request R10 is a request for instructing the multi-function device 10 to supply the specific use information to the intermediation server 50.

Upon acquiring the request R10 from the intermediation server 50, the control unit 30 of the multifunction device 10 acquires the specific use information from the use information table 36 within the memory 34. Next, the control unit 30 supplies the specific use information to the intermediation server 50.

The second acquiring unit 142 of the intermediation server 50 acquires the specific use information from the multi-function device 10. In this case, a second determining unit 144 (see FIG. 1) executes a determination process of S12. In the determination process of S12, the second determining unit 144 determines, by using the specific use information, whether the specific user is allowed to use the function (DL function or UL function) corresponding to the first selected function name ("DL" or "UL"). For example, in a situation in which the first selected function name is "DL", the second determining unit 144 determines NO in the determination process of S12 in the case where the DL use information included in the specific use information indicates "Unlock", and determines YES in the determination process of S12 is the case where the DL use information included in the specific use information indicates "Lock". Further, e.g., in a situation is which the first selected function name is "UL", the second determining unit 144 determines NO in the determination process of S12 in the case where the UL use information included in the specific use information indicates "Unlock", and determines YES in the determination process of S12 in the case where the UL use information included in the specific use information indicates "Lock".

In the case where YES is determined in the determination process of S12, the error process executing unit 146 supplies error screen information included in the plurality of screen information 66 to the multi-function device 10. This error screen information includes a character string indicating that the specific user is not allowed to use the function corresponding to the first selected function name, Upon acquiring the error screen Information from the intermediation server 50, the control unit 30 of the multi-function device 10 displays an error screen 336 (see FIG. 10) represented by the error screen information on the display unit 14. Thereby, the specific user can learn that he is not allowed to use the function corresponding to the first selected function name. Moreover, in this case, the control unit 30 does not execute the processes (to be described) for receiving a service from the service providing server 100. Thereby, in the multi-function device 10, the execution of a function corresponding to the first selected function name is prevented, and the specific user can be prevented from utilizing the function.

On the other hand, in the case where NO is determined in the determination process of S12, the SR process executing unit 145 supplies screen information included in the plurality of screen information 66 to the multi-function device 10. Here, the SR process executing unit 145 supplies print/media selecting screen information in the case where the first selected function name is "DL", and supplies scan/media selecting screen information in the case where the first selected function name is "UL".

Upon acquiring the print/media selecting screen information (or the scan/media selecting screen information) from the intermediation server 50, the control unit 30 of the multi-function device 10 displays, on the display unit 14, a print/media selecting screen 312 (or scan/media selecting screen 320) (see FIG. 10) represented by the print/media selecting screen information (or the scan/media selecting screen information). The print/media selecting screen 312 includes a function name "print" indicating the DL print function, and a function name "media" indicating the DL media function. Further, the scan/media selecting screen 320 includes a function name "scan" indicating the scan UL function, and a function name "media" indicating the media UL function. The specific user operates the operating unit 12 to select one function name (called "second selected function name" below) included in the print/media selecting screen 312 (or the scan/media selecting screen 320). In this case, the control unit 30 supplies the second selected function name to the intermediation server 50.

Upon acquiring the second selected function name from the multi-function device 10, in S14 the second determining unit 144 of the intermediation server 50 determines whether the first selected function name is "DL" and the second selected function name is "print". In a case of YES in S14 (I.e., in the case where the DL print function was selected by the specific user), the second determining unit 144 further determines, in S16, whether the remaining pages included in the specific use information indicate zero. The second determining unit 144 determines YES in S16 in a case where the remaining pages indicate zero, and determines NO in S16 in a case where the remaining pages indicate a number other than zero.

In the case where NO is determined in S16, the process proceeds to FIG. 7. On the other hand, in the case where YES is determined in S16, the error process executing unit 146 supplies error screen information included in the plurality of screen information 66 to the multi-function device 10. Because the number of pages of print medium available to the specific user before printing is zero, this error screen information includes a character string indicating that the specific user is not allowed to use the print function.

Upon acquiring the error screen information from the intermediation server 50, the control unit 30 of the multi-function device 10 displays, on the display unit 14, an error screen (not shown) represented by the error screen information. Thereby, the specific user can learn that the number of pages of print medium available to the specific user before printing is zero. Moreover, in this case, the control unit 30 does not execute the processes of FIG. 7 (to be described) for receiving the DL service from the service providing server 100. Thereby, in the multi-function device 10, the execution of the DL print function is prevented, and the specific user can be prevented from utilising the DL print function.

On the other hand, in a case where NO is determined in S14, the second determining unit 144 further determines, in S18, whether the first selected function name is "DL" and the second selected function name is "media". In a case of YES in S18 (i.e., in the case where the DL media function was selected by the specific user), the process proceeds to FIG. 7. Further, in a case of YES in S18 (i.e., in a case of the scan UL function or the media UL function was selected by the specific user), the second determining unit 144 further determines, in S20, whether the first selected function name is "UL" and the second selected function name is "scan". In a case of YES in S20 (i.e., in the case where the scan UL function was selected by the specific user), the process proceeds to FIG. 8. In a case of NO in S20 (i.e., in the case where the media UL function was selected by the specific user), the process proceeds to FIG. 9.

(Processes for DL function; FIG. 7)

In the case where NO is determined in S16 of FIG. 6 (i.e., in the case where the DL print function was selected by the specific user), or in the case where YES is determined in S18 of FIG. 6 (i.e., in the case where the DL media function was selected by the specific user), as shown in FIG. 7, the SR process executing unit 145 creates a request R20 according to the first API corresponding to the service providing server 100, and supplies the request R20 to the service providing server 100. The request R20 is a request for instructing tire service providing server 100 to supply, to the intermediation server 50, a folder same list indicating one or more folder names storing the image data uploaded by the specific user (i.e., the display name "Alice").

Moreover, as shown in FIG. 5, the intermediation server 50 supplies the request R6 to the multi-function device 10, and acquires the display name table 38 from the multi-function device 10. Consequently, the intermediation server 50 can specify, from the display name table 38, the access token "XXXXXXXX" associated with the selected server name "Server A" and the selected display name "Alice". The intermediation server 50 causes the service providing server 100 to execute authentication, using (he access token "XXXXXXXX", at the stage of supplying the request R20 to the service providing server 100, or at an earlier stage. Thereby, the service providing server 100 can supply an appropriate response to the intermediation server 50 in response to the request R20 acquired from the intermediation server 50, Moreover, below, a description of the authentication using the access token is omitted. However, as required (e.g., each lime a request is sent to the service providing server 100), the intermediation server 50 causes the service providing server 100 to execute authentication using the access token.

Upon acquiring the request R20, the service providing server 100 supplies the folder name list to the intermediation server 50.

Upon acquiring the folder name list from the service providing server 100, the SR process executing unit 145 of the intermediation server 50 writes one or more folder names (e.g., "F1", "F2") included in the folder name list into folder name selecting screen information included in the plurality of screen information 66. Next, the SR process executing unit 145 supplies, to the multi-function device 10, the folder name selecting screen information into which the one or more folder names have been written.

Upon acquiring the folder name selecting screen information from the intermediation server 50, the control unit 30 of the multi-function device 10 displays, on the display unit 14, a folder name selecting screen 314 (see FIG. 10) represented by the folder name selecting screen information. The specific user operates the operating unit 12 to select one folder name (called "selected folder name" below) included in the folder name selecting screen 314. In this case, the control mat 30 supplies the selected folder name to the intermediation server 50.

Upon acquiring the selected folder name from the multi-function device 10, the SR process executing unit 145 of the intermediation server 50 creates a request R22 according to the first API, and supplies the request R22 to the service providing server 100. The request R22 is a request for instructing the service providing server 100 to supply, to the intermediation server 50, URLs of one or more thumbnail image data (called "one or more thumbnail URLs" below) corresponding to the one or more image data stored in the folder having the selected folder name.

Upon acquiring the request R22, the service providing server 100 supplies the one or more thumbnail URLs to the intermediation server 50.

Upon acquiring the one or more thumbnail URLs from the service providing server 100, the SR process executing unit 145 of the intermediation server 50 supplies, to the multi-function device 10, the one or more thumbnail URLs and thumbnail selecting screen information included in the plurality of screen information 66.

Upon acquiring the one or more thumbnail URLs and the thumbnail selecting screen information from the intermediation server 50, the control unit 30 of the multi-function device 10 supplies a request R24 that includes the one or more thumbnail URLs to the service providing server 100 without going through the intermediation server 50.

Upon acquiring the request R24 from the multi-function device 10, the service providing server 100 supplies the one or more thumbnail image data, which are being stored at the location indicated by the one or more thumbnail URLs included in the request R24, to the multi-function device 10 without going through the intermediation server 50. In the present embodiment, the communication of the thumbnail image data is not executed via the intermediation server 50, and therefore private images of the specific user can be prevented from going through the intermediation server 50.

Upon acquiring the one or more thumbnail image data from the service providing server 100, the control unit 30 of the multi-function device 10 combines the one or more thumbnail image data in the thumbnail selecting screen information. Thereupon, the control unit 30 displays, on the display unit 14, a thumbnail selecting screen 316 (see FIG. 10) represented by the thumbnail selecting screen information in which the one or more thumbnail image data have been combined. The specific user can operate the operating unit 12 to select one thumbnail image data included in the thumbnail selecting screen 316. In this case, the control unit 30 supplies, to the intermediation server 50, a request R26 including one image ID (called "specific image ID" below) for specifying the one thumbnail image data selected by the specific user.

Upon acquiring the request 1126 from the multi-function device 10, the SR process executing unit 145 of the intermediation server 50 creates, according to the first API, a request R28 that includes the specific image ID, and supplies the request R28 to the service providing server 100. The request R28 is a request for instructing the service providing server 100 to supply, to the intermediation server 50, a URL (i.e., a URL of a download source; called "download URL" below) that indicates a location within the service providing server 100 where source image data of the thumbnail image data specified by the specific image ID is being stored.

Upon acquiring the request R28 from the intermediation server 50, the service providing server 100 supplies the download URL to the intermediation server 50.

Upon acquiring the download URL from the service providing server 100, the SR process executing unit 145 of the intermediation server 50 supplies, to the multi-function device 10, the download URL and in process screen information included in the plurality of screen information 66. Moreover, the SR process executing unit 145 supplies in process screen information including a character string indicating that printing is in process in the case where NO is determined in S16 of FIG. 6 (i.e., in the case where the DL print function was selected by the specific user), and supplies in process screen, information including a character string indicating that downloading is in process in the case where YES is determined in S18 of FIG. 6 (i.e., in the case where the DL media function was selected by the specific user).

Upon acquiring the in process screen information from the intermediation server 50, the control unit 30 of the multi-function device 10 displays, on the display unit 14, an is process screen 318 (see FIG. 10) represented by the in process screen information. Upon acquiring the download URL from the intermediation server 50, the control unit 30 supplies a download request R30 that includes the download URL to the service providing server 100 without going through the intermediation server 50. The download request R30 is a request for instructing the service providing server 100 to supply, to the multi-function device 10, image data that is being stored in the location indicated by the download URL. That is, the control unit 30 requests the service providing server 100 to provide the DL service.

Upon acquiring the download request R30 from the multi-function device 10, the service providing server 100 supplies image data, which is being stored in the location indicated by the download URL included in the download request R30, to the multi-function device 10 without going through the intermediation server 50. In the present embodiment, the communication of the image data is not performed via the intermediation server 50, and therefore private Images of the specific user can be prevented from going through the intermediation server 50.

The control unit 30 of the multi-function device 10 acquires the image data from the service providing server 100. Thereby, the control unit 30 can receive the DL service front the service providing server 100. In other words, the control unit 30 executes the DL function. Moreover, in the case where the DL print function was selected by the specific user, the control unit 30 causes the print executing unit 18 to print an Image represented by the image data. That is, the control unit 30 executes the DL print function. Further, in the case where the DL media function was selected by the specific user, the control unit 30 causes the image data to be stored in an external memory (not shown) connected with the multi-function device 10. That is, the control unit 30 executes the DL media function.

(Processes for Scan UL Function; FIG. 8)

In the case where YES is determined in the determination process of S20 of FIG. 6 (i.e., in the case where the scan UL function was selected by the specific user), as shown in FIG. 8, the SR process executing unit 145 supplies scan setting screen information included in the plurality of screen information 66 to the multi-function device 10.

Upon acquiring the scan selling screen information from the intermediation server 50, the control unit 30 of the multi-function device 10 displays, on the display unit 14, a scan selling screen 322 (see FIG. 10) represented by the scan setting screen information. The specific user operates the operating unit 12 to select, on the scan setting screen 322, various setting items for scanning (scan resolution, file format, size of scan data). The specific user operates the operating unit 12 to select an OK button included in the scan setting screen 322. In this case, the control unit 30 supplies a request R40 to the intermediation server 50.

Upon acquiring the request R40 from the multi-function device 10, the SR process executing unit 145 of the intermediation server 50 creates a request R42 according to the first API, and supplies the request R42 to the service providing server 100. The request R42 is a request for instructing the service providing server 100 to supply, to the intermediation server 50, a URL (i.e., a URL of an upload destination; called "upload URL" below) that indicates a location within the service providing server 100 where image data created by scanning is to be stored.

Upon acquiring the request R42 from the intermediation server 50, the service providing server 100 supplies the upload URL to the intermediation server 50.

Upon acquiring the upload URL from the service providing server 100, the SR process executing unit 145 of the intermediation server 50 supplies, to the multi-function device 10, the upload URL and in process screen information included in the plurality of screen information 66. Moreover, this in process screen information includes a character string indicating that a scan is being executed.

Upon acquiring the in process screen information from the intermediation server 50, the control unit 30 of the multi-function device 10 displays, on the display unit 14, an in process screen 324 (see FIG. 10) represented by the in process screen information. Further, upon acquiring the upload URL from the intermediation server 50, the control unit 30 causes the scan executing unit 20 to scan a document. Next without going through the intermediation server 50, the control unit 30 supplies, to the service providing server 100, an upload request R44 that includes the upload URL acquired from the intermediation server 50 and scan data created by the scan executing unit 20. In the present embodiment, the communication of the scan data is not executed via the intermediation server 50, and therefore private images of the specific user can be prevented from going through the intermediation server 50. Moreover, the upload request R44 is a request for instructing the service providing server 100 to store the scan data at the location indicated by the upload URL. That is, the control unit 30 requests the service providing server 100 to provide the UL service.

Upon acquiring the upload request R44 from the multi-function device 10, the service providing server 100 stores the scan data included in the upload request R44 at the location indicated by the upload URL included in the upload request R44. Thereby, the control unit 30 of the multi-function device 10 can receive the UL service from the service providing server 100. In other words, the control unit 30 can execute the scan UL function.

(Processes for Media UL Function; FIG. 9)

In the case where NO is determined in S20 of FIG. 6 (i.e., in the case where the media UL function was selected by the specific user), as shown in FIG. 9, the SR process executing unit 145 creates a request R52 according to tire first API, and supplies the request R52 to the service providing server 100. Thereby, as in the case of the request R42 of FIG. 8, the SR process executing unit 145 acquires the upload URL from the service providing server 100, and supplies the upload URL and in process screen information included in the plurality of screen information 66 to the multi-function device 10. Moreover, this in process screen information includes a character string indicating that uploading is in process.

Upon acquiring the in process screen information from the intermediation server 50, the control unit 30 of the multi-function device 10 displays, on the display unit 14, an in process screen (not shown) represented by the in process screen information. Further, upon acquiring the upload URL from the intermediation server 50, the control unit 30 acquires data from the external memory connected with the multi-function device 10. Next, the control unit 30 supplies an upload request R54, which includes the upload URL acquired from the intermediation server 50 and the data acquired from the external memory, to the service providing server 100 without going through the intermediation server 50. Thereby, the control unit 30 of the multi-function device 10 can execute the media UL function.

(Effects of the First Embodiment)

In the present embodiment, in the case where the service providing server 100 is selected by the specific user via the server name selecting screen 306 (see FIG. 10), the intermediation server 50 determines whether a usable function exists (S10 of FIG. 5) by using the specific use information and the specific corresponding functions ("DL" and "UL"). In the case of determining that a usable function exists (NO in S10 of FIG. 5), the intermediation server 50 executes a process for displaying the DL/UL selecting screen 310 (see FIG. 10) on the multi-function device 10. Thereby, provision of a service from the service providing server 100 to the multi-function device 10 is permitted. On the other hand, in the case of determining that a usable function does not exist (YES in S10 of FIG. 5), the intermediation server 50 executes a process for displaying the error screen 334 (see FIG. 10) on the multi-function device 10. Thereby, provision of a service from the service providing server 100 to the multi-function device 10 is prohibited. Consequently, in the case where the service providing server 100 is selected by the specific user, the intermediation server 50 can execute an appropriate process in accordance with corresponding functions of the service providing server 100 and the use information for the specific user.

In particular, in the present embodiment, the intermediation server 50 can display the error screen 334 at the timing when the service providing server 100 was selected in the server name selecting screen 306 (see FIG. 10). For example, a configuration can be conceived in which, after various selections have been executed in the screens 306, 308, 310, the determination process of FIG. 5 of S10 is executed and, in the case of YES here, the error screen 334 is displayed (called "first comparative configuration" below). In the first comparative configuration, even though it is decided to display the error screen 334 at the timing when the service providing server 100 was selected in the server name selecting screen 306, the specific user must execute selections in the subsequent screens 308, 310, thus making the specific user perform unnecessary selection operations. In the present embodiment, unlike the first comparative configuration, the intermediation server 50 can display the error screen 334 at the timing when the service providing server 100 was selected in the server name selecting screen 306, and consequently the specific user is not made to perform the unnecessary selection operations.

In the case where the DL function or UL function is selected by the specific user in the DL/UL selecting screen 310, the intermediation server 50 further determines whether the specific user is allowed to use the selected function (S12 of FIG. 6). In the case of determining that the specific user is allowed to use the selected function, the intermediation server 50 executes a process for displaying, on the multi-function device 10, the selecting screens 312, 314, 316, 320, 322 for selecting the conditions for executing the selected function. On the other hand, in the case of determining that the specific user is not allowed to use the selected function, the intermediation server 50 executes a process for displaying the error screen 336 (see FIG. 10) on the multi-function device 10. Thereby, provision of a service from the service providing server 100 to the multi-function device 10 is prohibited. Consequently, in the case where the DL function or UL function is selected by the specific user, the intermediation server 50 can execute an appropriate process in accordance with the specific user.

For example, a configuration can be conceived in which, after various selections have been executed in the screens 312, 314, 316, 320, 322, the determination process of S12 of FIG. 6 is executed and, in the case of YES here, the error screen 336 is displayed (called "second comparative configuration" below). In the second comparative configuration, even though, it is decided to display the error screen 336 at the timing when the DL function or UL function was selected in the DL/UL selecting screen 310, the specific user must execute selections in the subsequent screens 312, 314, 316, 320, 322, thus making the specific user perform unnecessary selection operations. In the present embodiment, unlike the second comparative configuration, the intermediation server 50 can display the error screen 336 at the tuning when the DL function or UL function was selected in the DL/UL selecting screen 310, and consequently the specific user is not made to perform the unnecessary selection operations.

Further, in the present embodiment, the multi-function device 10 acquires the error screen information representing the error screens 334, 336 from the intermediation server 50. Consequently, the error screen information does not need to be stored in advance in the memory 34 of the multi-function device 10. Consequently, the amount of information to be stoned in the multi-function device 10 can be reduced. Moreover, in a variant, the error screen information may be stored in advance in the memory 34 of the multi-function device 10. In this case, the multi-function device 10 may display the error screens 334, 336 by using the error screen information within the memory 34.

Further, the multi-function device 10 supplies the specific use information to the intermediation server 50 in the case of acquiring the request R4 (see FIG. 5) or the request R10 (see FIG. 6). According to this configuration, in the case where the determination processes S10, S12 are to be executed, the intermediation server 50 can acquire the specific use information from the multi-function device 10. Consequently, in a situation in which the determination processes S10, S12 do not need to be executed, the intermediation server 50 does not need to manage (i.e., save) the specific use information. Moreover, in a variant, the intermediation server 50 may store the specific use information, which is acquired in response to the request R4 (see FIG. 5), in the memory 64. In this case, in the case where, e.g., the determination process S12 (see FIG. 6) is to be executed, the intermediation server 50 may execute the determination process S12 by using the specific use information within the memory 64 without supplying the request R10 (see FIG. 6) to the multi-function device 10.

(Corresponding Relationships)

The control unit 60 of the intermediation server 50 and the service providing server 100 are respectively examples of the "controlling device" and the "specific service providing server". The memory 64 and the server table 68 of the intermediation server 50 are respectively examples of the "first storage unit" and the "plurality of function information". The memory 34 and the use information table 36 of the multi-function device 10 are respectively examples of the "second storage unit" and the "plurality of use information".

The process for supplying the DL/UL selecting screen information to the multi-function device 10, and the DL/UL selecting screen 310, are respectively examples of the "first service receiving process" and the "function selecting screen". The process for supplying the error screen information representing the error screen 334 to the multi-function device 10, and the error screen 334, are respectively examples of the "first error process" and the "first error screen". The process for supplying the print/media selecting screen information (or the folder name selecting screen information) to the multi-function device 10, and the print/media selecting screen 312 (or the folder same selecting screen 314), are respectively examples of the "second service receiving process" and the "condition selecting screen". Further, the process for supplying the scan/media selecting screen information (or the scan setting screen information) to the multi-function device 10, and the scan/media selecting screen 320 (or the scan setting screen 322), are respectively examples of the "second service receiving process" and the "condition selecting screen". The process for supplying the error screen information representing the error screen 336 to the multi-function device 10, and the error screen 336, are respectively examples of the "second error process" and the "second error screen".

Second Embodiment

Points differing from the first embodiment will be described. In the first embodiment, the units 141 to 146 of the intermediation server 50 operate. In the second embodiment, the units 41 to 46 of the multi-function device 10 operate.

As shown in FIG. 11, the processes until the user information input screen 300 and the main screen 302 are displayed are the same as FIG. 5. When the character string "Internet" included in the main screen 302 is selected, a first acquiring unit 41 (see FIG. 1) of the multi-function device 10 supplies a request R60 to the intermediation server 50.

Upon acquiring the request R60 from the multi-function device 10, the control unit 60 of the intermediation server 50 supplies, to the multi-function device 10, the server name selecting screen information included in the plurality of screen information 66, the server table 68, and the error screen information included in the plurality of screen information 66 (i.e., the error screen information representing the error screen 334 (see FIG. 10)).

Upon acquiring the server name selecting screen information from the intermediation server 50, the control unit 30 of the multi-function device 10 displays, on the display unit 14, the server name selecting screen 306 (see FIG. 10) represented by the server name selecting screen information. The specific user selects one server name (i.e., the selected server name). In this case, the first acquiring unit 41 acquires the specific corresponding functions associated with the selected server name from the server table 68 acquired from the intermediation server 50. Further, a second acquiring unit 42 (see FIG. 1) acquires the specific use information from the use information table 36 within the memory 34. Next, a first determining unit 43 (see FIG. 1) executes the determination process of S30 by using the specific corresponding functions and the specific use information, in the same manner as the determination process of S10 of FIG. 5 of the first embodiment.

In the case where YES is determined in the determination process of S30, an error process executing unit 46 (see FIG. 1) displays, on the display unit 14, the error screen 334 (see FIG. 10) represented by the error screen information acquired from the intermediation server 50. Moreover, in this case, the control unit 30 does not execute the processes for receiving a service from the service providing server 100. On the other hand, in the case where NO is determined in the determination process of S30, an SR process executing unit 45 (see FIG. 1) supplies the selected server name to the intermediation server 50.

Upon acquiring the selected server name from the multi-function device 10, the control unit 60 of the intermediation server 50 supplies a request R62 to the multi-function device 10, and acquires the display name table 38 from the multi-function device 10. Next, the control unit 60 supplies the display name selecting screen information to the multi-function device 10.

Upon acquiring the display name selecting screen information from the intermediation server 50, the SR process executing unit 45 of the multi-function device 10 displays, on the display unit 14, the display name selecting screen 308 represented by the display name selecting screen information. The specific user selects one display name (i.e., the selected display name). In this case, the SR process executing unit 45 supplies the selected display name to the Intermediation server 50.

Upon acquiring the selected display name from the multi-function device 10, the control unit 60 of the intermediation server 50 supplies, to the multi-function device 10, the DL/UL selecting screen information included in the plurality of screen information 66, and the error screen information included in the plurality of screen information 66 (i.e., the error screen information representing the error screen 336 (see FIG. 10)).

Upon acquiring the DL/UL selecting screen information from the intermediation server 50, the SR process executing wait 45 of the multi-function device 10 displays, on the display unit 14, the DL/UL selecting screen 310 (see FIG. 10) represented by the DL/UL selecting screen information. The specific user selects one function name (i.e., the first selected function name). In this case, the second acquiring unit 42 acquires the specific use information from the use information table 36 within the memory 34. Next, a second determining unit 44 (see FIG. 1) executes a determination process of S32 in the same manner as the determination process of S12 of FIG. 6 of the first embodiment.

In the case where YES is determined in S32, the error process executing unit 46 displays, on the display unit 14, the error screen 336 (see FIG. 10) represented by the error screen information acquired from the intermediation server 50. Moreover, in this case, the control unit 30 does not execute the processes for receiving a service from the service providing server 100. On the other hand, in the case where NO is determined in S32, the SR process executing unit 45 supplies the first selected function name ("DL" or "UL") to the intermediation server 50.

Upon acquiring the first selected function name from the multi-function device 10, the control unit 60 of the intermediation server 50 supplies, to the multi-function device 10, the selecting screen information (the print/media selecting screen information or the scan/media selecting screen information) that corresponds to the first selected function name.

Upon acquiring the selecting screen information from the intermediation server 50, the SR process executing unit 45 of the multi-function device 10 displays, on the display unit 14, the selecting screen 312 or 320 (see FIG. 10) represented by the selecting screen information. The specific user selects one function name (i.e., the second selected function name). In this case, the second determining unit 44 executes determination processes S34 and S36 of FIG. 12 in the same manner as the determination processes S14 and S16 of FIG. 6.

In the case where YES is determined in S36, the error process executing unit 46 displays an error screen (not shown) on the display unit 14. Moreover, after YES was determined in S36, the error process executing unit 46 may acquire the error screen information from the intermediation server 50, and display the error screen, or may display the error screen by using error screen information (see FIG. 11) acquired together with the DL/UL selecting screen information from the intermediation server 50. On the other hand, in the case where NO is determined in S36, the SR process executing unit 45 supplies the second selected function name ("print", "scan" or "media") to the intermediation server 50.

Upon acquiring the second selected function name from the multi-function device 10, the control unit 60 of the intermediation server 50 executes determination processes S38, S40, S42 in the same manner as the determination processes S14, S18, S20 of FIG. 6. The point of executing the processes of FIG. 7 to FIG. 9 in accordance with the determination results is the same as the first embodiment. Moreover, in the processes of FIG. 7 to FIG. 9, the SR process executing unit 45 of the multi-function device 10 executes various communications with the intermediation server 50 and the service providing server 100, and executes a process for receiving a service from the service providing server 100.

(Effects of the Second Embodiment)

The multi-function device 10 executes the determination processes of S30, S32 of FIG. 11, and can execute appropriate processes in accordance with the determination results. As in the first embodiment, the multi-function device 10 can display the error screen 334 at the timing when the service providing server 100 was selected in the server name selecting screen 306, and consequently the specific user is not made to perform the unnecessary selection operations. Further, the multi-function device 10 can display the error screen 336 at the timing when the DL function or UL function was selected in the DL/UL selecting screen 310, and consequently the specific user is sot made to perform unnecessary selection operations. Moreover, in the present embodiment, the control unit 30 of the multi-function device 10 is an example of the "controlling device".

Third Embodiment

Points differing from the second embodiment will be described. When one display name (i.e., the selected display name) is selected is the display name selecting screen 308 (see FIG. 14), the processes until the selected display name is supplied from the multi-function device 10 to the intermediation server 50 is the same as the second embodiment. Upon acquiring the selected display name from the multi-function device 10, the control unit 60 of the intermediation server 50 supplies the DL/UL selecting screen information and grayout information to the multi-function device 10. The grayout information is information which, for each of the function names "DL" and "UL" included in the DL/UL selecting screen information, instructs the multi-function device 10 on the circumstances for displaying the function name in a display mode in which selecting can be performed, or the circumstances for displaying the function name in a display mode in which selecting cannot he performed (so-called grayout).

Upon acquiring the DL/UL selecting screen information and the grayout information from the intermediation server 50, the SR process executing unit 45 of the multi-function device 10 executes the following processes based on this information. The DL/UL selecting screen information that is acquired from the intermediation server 50 is configured so as to be displayed in a display mode where both the function names "DL" and "UL" can be selected. In the case where the specific corresponding functions (i.e., the corresponding functions associated with the selected server name in the server table 68) indicate that the service providing server cannot correspond to the DL function, or in the case where the specific use information indicates that the specific user is not allowed to use the DL function, the SR process executing unit 45 changes the DL/UL selecting screen information such that the function name "DL" is displayed in the grayout display mode in which selecting cannot be performed. Further, in the case where the specific corresponding functions indicate that the service providing server cannot correspond to the UL function, or in the case where the specific use information indicates that the specific user is not allowed to use the UL function, the SR process executing unit 45 changes the DL/UL selecting screen information such that the function name "UL" is displayed in the grayout display mode in which selecting cannot be performed. The SR process executing unit 45 displays, on the display unit 14, a DL/UL selecting screen 310' (see FIG. 14) represented by the changed DL/UL selecting screen information.

Since only the function name "DL" can be selected in the DL/UL selecting screen 310' of FIG. 14, the specific user selects the function name "DL" (i.e., the first selected function name). In this case, the SR process executing unit 45 supplies the first selected, function name to the intermediation server 50. Moreover, in this case, the second determining unit 44 does not execute the determination process of S32 of FIG. 11. This is because a function name indicating a function that the specific user is not allowed to use will not be selected in the DL/UL selecting screen 310'. Moreover, in the example of FIG. 14 the function name "UL" indicating the function that the specific user is not allowed to use is displayed in the grayout display mode. However, in a variant, the SR process executing unit 45 may display the DL/UL selecting screen on the display unit 14 such that a function name indicating a function that the specific user is not allowed to use is not displayed (i.e., such that only the function name indicating a function that the specific user is allowed to use is displayed). The processes after the intermediation server 50 has acquired the first selected function name are the same as the processes of FIG. 11 and FIG. 12 of the second embodiment.

(Effects of the Third Embodiment)

In the present embodiment, the multi-function device 10 displays the DL/UL selecting screen 310' (see FIG. 14) in a display mode where only the function name indicating a function that the specific user is allowed to use can be selected. Consequently, the selection of a function name indicating a function that the specific user is not allowed to use and the display of an error screen does not occur. The specific user can appropriately select a function name indicating a function that the specific user is allowed to use. Moreover, in the present embodiment, the process for displaying the DL/UL selecting screen 310' (see FIG. 14) is an example of the "first service receiving process".

(Variant of the Third Embodiment)

In the third embodiment, the SR process executing unit 45 of the multi-function device 10 acquires the grayout formation from the intermediation server 50, and changes the DL/UL selecting screen information so as to display in the grayout display mode. Instead, e.g., in the first embodiment, the SR process executing unit 145 of the intermediation server 50 may acquire the specific use information from the multi-function device 10 and change the DL/UL selecting screen information by using the specific use information and the specific corresponding functions. Thereupon, the SR process executing unit 145 may supply the changed DL/UL selecting screen information to the multi-function device 10. According to the present variant, also, the DL/UL selecting screen 310' (see FIG. 14) can be displayed in the multi-function device 10.

Fourth Embodiment

In the above embodiments, the use information table 36 is stored in the memory 34 of the multi-function device 10. In the fourth embodiment, the use information table 36 is stored in an administrative server 95 (see FIG. 1), and is not stored is the memory 34. For example, the specific user operates an operating unit of the PC 90 to access the administrative server 95 and store the use information table 36 in the administrative server 95. Moreover, in the present embodiment, the administrative server 95 is connected with the LAN 4. However, the administrative server 95 may be present outside the LAN 4 (i.e., the Internet 6).

For example, in the first embodiment, in the case of acquiring the request R4 of FIG. 5 or the request R10 of FIG. 6, the control unit 30 of the multi-function device 10 supplies a request to the administrative server 95, and acquires the specific use information from the use information table 36 within the administrative server 95. In this case, the control unit 30 supplies, to the intermediation server 50, the specific use information that was acquired from the administrative server 95. Thereby, the second acquiring unit 142 of the intermediation server 50 acquires the specific use information from the multi-function device 10. That is, the second acquiring unit 142 acquires the specific use information from the administrative server 95 via the multi-function device 10.

Further, e.g., in the second embodiment, in the case where the determination process of S30 of FIG. 11 or the determination process of S32 of FIG. 11 is to be executed, the second acquiring unit 42 of the multi-function device 10 acquires the specific use information from the use information table 36 within the administrative server 95.

According to the present embodiment, the use information table 36 does not need to be stored in the memory 34 of the multi-function device 10. Consequently, the amount of information that the multi-function device 10 needs to store can be reduced. Moreover, in the present embodiment, a memory (not shown) within the administrative server 95 is an example of the "second storage unit".

(Variant of Fourth Embodiment)

For example, in the first embodiment, in the case where the determination process of S10 of FIG. 5 or the determination process of S12 of FIG. 6 is to be executed, the second acquiring unit 142 of the intermediation server 50 does not need to supply the requests R4, R10 to the multi-function device 10. In (his case, the second acquiring unit 142 supplies a request to the administrative server 95, and acquires the specific use information from the use information table 36 within the administrative server 95. That is, the second acquiring unit 142 may acquire the specific use information from (he administrative server 95 without going through the multi-function device 10.

(Another Variant of Fourth Embodiment)

If the administrative server 95 of the fourth embodiment is used, the following configuration can also be realized. That is, the server table 68 is stored in the administrative server 95, and is not stored in the memory 64 of the intermediation server 50. For example, in the first embodiment, in the case where the determination process of S10 of FIG. 5 or the determination process of S12 of FIG. 6 is to be executed, the first acquiring unit 141 of the intermediation server 50 may acquire the server table 68 from the administrative server 95, and acquire the specific corresponding functions from the server table 68. Further, e.g., in the second embodiment, in the case where the determination process of S30 of FIG. 11 or the determination process of S32 of FIG. 11 is to be executed, the first acquiring unit 41 of the multi-function device 10 may acquire the server table 68 from the administrative server 95 via the intermediation server 50 or not via the intermediation server 50, and acquire the specific corresponding functions from the server table 68. Moreover, in the present variant, a memory (not shown) within the administrative server 95 is an example of the "first storage unit".

(Variant 1)

In the above embodiments, the DL function and the UL function are respectively examples of the "first, function" and the "second function". Instead, in the variant, the DL print function and the DL media function may respectively be examples of the "first function" and the "second function". For example, a situation is assumed in which a service providing server which has the server name "Server D" is a server that handles only PDF data as a download target, and the multi-function device 10 is capable of printing in accordance with data having a format different than PDF, but is not capable of printing in accordance with PDF data. In this case, the service providing server having the server name "Server D" may not correspond to the DL print function of the multi-function device 10, and "DL media function only" may be associated with the server name "Server D" in the server table 68. Further, in another variant, the scan UL function and the media UL function may respectively be the "first function" and the "second function". For example, a situation is assumed in which a service providing server which has the server name "Server E" is a server that handles only PDF data as an upload target, and the multi-function device 10 is capable of displaying and selecting (i.e. is capable of uploading) data having a format different than PDF within the media, but is not capable of displaying and selecting (i.e. is not capable of uploading) the PDF data within the media. In this case, the service providing server having the server name "Server E" may not correspond to the media UL function of the multi-function device 10, and "scan UL function only" may be associated with the server name "Server E" in the server table 68. In general terms, the "first function" and the "second function" may be any function that the multi-function device is capable of executing and which is a function related to any service (DL service, UL service) that the service providing server provides.

(Variant 2)

Is the above embodiments, information indicating whether each function is "Unlock" or "Lock" is registered in the use information table 36 in association with each user. Instead, only the "Unlock" function, or only the "Lock" function may be registered, in the use information table 36 in association with each user. In general terms, the use information may include any information relating to whether the user is allowed to use the first function (e.g., the DL function) and the second function (e.g., the UL function).

(Variant 3)

There is no particular restriction on the character strings included in the error screens 334, 336. For example, the error screens 334, 336 may simply include only the character string "Error". In general terms, the "first (or second) error screen" may include only the character string "Error", or may include a character string for describing the contents of the error.

(Variant 4)

In the above embodiments, the SR process executing units 45, 145 display the DL/UL selecting screen 310 as the "first service receiving process". However, the "first service receiving process" may be a process for displaying the display name selecting screen 308, or may be considered as a process for displaying the other selecting screens 312, 314, 316, 320, 322. Further, the SR process executing units 45, 145 display the print (or scan)/media selecting screens 312, 320 as the "second service receiving process". However, the "second service receiving process" may be a process for displaying the other selecting screens 314, 316, 322.

(Variant 5)

In the above embodiments, the functions of the units 41 to 46, 141 to 146 are realized by the CPUs 32, 62 of the multi-function device 10 and the intermediation server 50 executing processes according to software. Instead, at least a part of the functions of the units 41 to 46, 141 to 146 may be realized by hardware such as a logic circuit, etc.

The invention claimed is:

1. A controlling device for a multi-function device configured to execute a first function and a second function, the controlling device comprising:
    a processor; and
    a memory configured to store computer-readable instructions therein, the computer-readable instructions, when executed by the processor, causing the controlling device to operate as:
        a first acquiring unit configured to acquire specific function information for a specific service providing server from a first storage unit in a case where the specific service providing server is selected from among a plurality of service providing servers by a specific user who uses the multi-function device, the first storage unit configured to store a plurality of function information for the plurality of service providing servers, and each function information including information related to whether or not each service providing server can correspond to the first function and whether or not each service providing server can correspond to the second function, the plurality of service providing servers including a first service providing server corresponding to the first function and the second function, a second service providing server corresponding to the first function and not corresponding to the second function, and a third service providing server corresponding to the second function and not corresponding to the first function;
        a second acquiring unit configured to acquire specific use information for the specific user from a second storage unit, the second storage unit configured to store a plurality of use information for a plurality of users, and each use information including information related to whether or not each user is allowed to use the first function and whether or not each user is allowed to use the second function, the plurality of use information including first use information indicating that a first user is allowed to use the first function and is not allowed to use the second function, and second use information indicating that a second user is not allowed to use the first function and is allowed to use the second function;
        a first determining unit configured to determine, by using the specific function information and the specific use information, whether or not a usable function exists, the usable function being a function to which the specific service providing server can correspond and that the specific user is allowed to use,
    wherein the first determining unit is configured to:
        determine that the usable function that is the first function exists in a case where the specific function information is related to the first service providing server and the specific use information is the first use information;
        determine that the usable function that is the first function exists in a case where the specific function information is related to the second service providing server and the specific use information is the first use information;
        determine that the usable function does not exist in a case where the specific function information is related to the third service providing server and the specific use information is the first use information;
        determine that the usable function that is the second function exists in a case where the specific function information is related to the first service providing server and the specific use information is the second use information;
        determine that the usable function does not exist in a case where the specific function information is related to the second service providing server and the specific use information is the second use information; and
        determine that the usable function that is the second function exists in a case where the specific function information is related to the third service providing server and the specific use information is the second use information;
    a service receiving process executing unit configured to execute a first service receiving process for the multi-function device to receive a service related to the usable function from the specific service providing server in a first case where it is determined that the usable function exists; and
    an error process executing unit configured to execute a first error process for prohibiting the multi-function device to receive a service from the specific service providing server in a second case where it is determined that the usable function does not exist.

2. The controlling device according to claim 1, wherein the first determining unit is configured to determine that the usable function exists in a case where at least one function that the specific user is allowed to use exists among N-pieces of functions (N being an integer of 1 or more) to which the specific service providing server can correspond, and
the first determining unit is configured to determine that the usable function does not exist in a case where a function that the specific user is allowed to use does not exist among the N-pieces of functions.

3. The controlling device according to claim 1, wherein in the first case, the service receiving process executing unit is configured to execute the first service receiving process of displaying a function selecting screen on a display unit of the multi-function device, the function selecting screen receiving a selection from the specific user of a specific function from among N-pieces of functions (N being an integer of 1 or more) to which the specific service providing server can correspond, and
in the second case, the error process executing unit is configured to execute the first error process of displaying a first error screen on the display unit of the multi-function device, the first error screen indicating that the multi-function device is not capable of receiving any service from the specific service providing server.

4. The controlling device according to claim 3, wherein the computer-readable instructions, when executed by the processor, cause the controlling device to further operate as:
   a second determining unit configured to determine, by using the specific use information, whether or not the specific user is allowed to use the specific function, in a case where the specific function is selected by the specific user via the function selecting screen,
   wherein, in a third case where it is determined that the specific user is allowed to use the specific function, the service receiving process executing unit is configured to further execute a second service receiving process for the multi-function device to receive a specific service related to the specific function from the specific service providing server, and
   in a fourth case where it is determined that the specific user is not allowed to use the specific function, the error process executing unit is configured to further execute a second error process for prohibiting the multi-function device from receiving the specific service from the specific service providing server.

5. The controlling device according to claim 4, wherein
   in the third case, the service receiving process executing unit is configured to execute the second service receiving process of displaying a condition selecting screen on the display unit of the multi-function device, the condition selecting screen that receives a selection from the specific user of a condition for the multi-function device to execute the specific function, and
   in the fourth case, the error process executing unit is configured to execute the second error process of displaying a second error screen on the display unit of the multi-function device, the second error screen indicating that the multi-function device is not capable of receiving the specific service from the specific service providing server.

6. The controlling device according to claim 3, wherein in the first case, the service receiving process executing unit is configured to execute the first service receiving process of displaying the function selecting screen on the display unit of the multi-function device with a display configuration with which a function that the specific user is allowed to use among the N-pieces of functions can be selected by the specific user, and a function that the specific user is not allowed to use among the N-pieces of functions cannot be selected by the specific user.

7. The controlling device according to claim 1, wherein the controlling device is provided within an intermediation server configured to intermediate a service provision from the plurality of service providing servers to the multi-function device.

8. The controlling device according to claim 1, wherein the controlling device is provided within the multi-function device.

9. The controlling device according to claim 1, wherein
   the first function includes a downloading function for the multi-function device to download data from one of the plurality of service providing servers, and
   the second function includes an uploading function for the multi-function device to upload data to one of the plurality of service providing servers.

10. A non-transitory computer-readable storage medium storing computer-readable instructions for a controlling device for a multi-function device capable of executing a first function and a second function, the computer-readable instructions, when executed by a processor of the controlling device, causing the controlling device to perform:
   acquiring specific function information for a specific service providing server from a first storage unit in a case where the specific service providing server is selected from among a plurality of service providing servers by a specific user who uses the multi-function device, the first storage unit configured to store a plurality of function information for the plurality of service providing servers, and each function information including information related to whether or not each service providing server can correspond to the first function and whether or not each service providing server can correspond to the second function, the plurality of service providing servers including a first service providing server corresponding to the first function and the second function, a second service providing server corresponding to the first function and not corresponding to the second function, and a third service providing server corresponding to the second function and not corresponding to the first function;
   acquiring specific use information for the specific user from a second storage unit, the second storage unit configured to store a plurality of use information for a plurality of users, and each use information including information related to whether or not each user is allowed to use the first function and whether or not each user is allowed to use the second function, the plurality of use information including first use information indicating that a first user is allowed to use the first function and is not allowed to use the second function, and second use information indicating that a second user is not allowed to use the first function and is allowed to use the second function;
   determining, by using the specific function information and the specific use information, whether or not a usable function exists, the usable function being a function to which the specific service providing server can correspond and that the specific user is allowed to use,
   wherein the determining comprises:
      determining that the usable function that is the first function exists in a case where the specific function information is related to the first service providing server and the specific use information is the first use information;
      determining that the usable function that is the first function exists in a case where the specific function information is related to the second service providing server and the specific use information is the first use information;
      determining that the usable function does not exist in a case where the specific function information is related to the third service providing server and the specific use information is the first use information;
      determining that the usable function that is the second function exists in a case where the specific function information is related to the first service providing server and the specific use information is the second use information;
      determining that the usable function does not exist in a case where the specific function information is related to the second service providing server and the specific use information is the second use information; and
      determining that the usable function that is the second function exists in a case where the specific function information is related to the third service providing server and the specific use information is the second use information;

executing a first service receiving process for the multi-function device to receive a service related to the usable function from the specific service providing server in a first case where it is determined that the usable function exists; and executing a first error process for prohibiting the multi-function device to receive a service from the specific service providing server in a second case where it is determined that the usable function does not exist.

* * * * *

UNITED STATES PATENT AND TRADEMARK OFFICE
CERTIFICATE OF CORRECTION

PATENT NO. : 8,917,401 B2  
APPLICATION NO. : 13/705721  
DATED : December 23, 2014  
INVENTOR(S) : Ken Saito et al.

Page 1 of 1

It is certified that error appears in the above-identified patent and that said Letters Patent is hereby corrected as shown below:

Title page, item (57) Abstract:

Please delete "where h determined" and insert --where it is determined--

Signed and Sealed this  
Sixteenth Day of August, 2016

Michelle K. Lee  
*Director of the United States Patent and Trademark Office*